(12) United States Patent
Stephen et al.

(10) Patent No.: US 11,721,075 B2
(45) Date of Patent: Aug. 8, 2023

(54) SYSTEMS AND METHODS FOR INTEGRATING AND USING AUGMENTED REALITY TECHNOLOGIES

(71) Applicant: Computer Generated Solutions, Inc., New York, NY (US)

(72) Inventors: Douglas Stephen, Saint John (CA); Micah White, Rothesay (CA); Philip Friedman, New York, NY (US)

(73) Assignee: COMPUTER GENERATED SOLUTIONS, INC., New York, NY (US)

( * ) Notice: Subject to any disclaimer, the term of this patent is extended or adjusted under 35 U.S.C. 154(b) by 125 days.

(21) Appl. No.: 17/520,155

(22) Filed: Nov. 5, 2021

(65) Prior Publication Data

US 2022/0139049 A1    May 5, 2022

Related U.S. Application Data

(60) Provisional application No. 63/110,281, filed on Nov. 5, 2020.

(51) Int. Cl.
| | | |
|---|---|---|
| *G06T 19/00* | (2011.01) | |
| *G05B 19/4155* | (2006.01) | |
| *G06T 13/00* | (2011.01) | |
| *G06F 3/0482* | (2013.01) | |
| *G06V 20/20* | (2022.01) | |

(52) U.S. Cl.
CPC ........ *G06T 19/006* (2013.01); *G05B 19/4155* (2013.01); *G06F 3/0482* (2013.01); *G06T 13/00* (2013.01); *G06V 20/20* (2022.01); *G05B 2219/50391* (2013.01); *G06T 2200/24* (2013.01); *G06T 2219/004* (2013.01)

(58) Field of Classification Search
None
See application file for complete search history.

(56) References Cited

U.S. PATENT DOCUMENTS

| | | |
|---|---|---|
| 2018/0253900 A1 | 9/2018 | Finding et al. |
| 2019/0318540 A1* | 10/2019 | Piemonte .............. H04L 67/131 |
| 2020/0218690 A1 | 7/2020 | Huston et al. |

FOREIGN PATENT DOCUMENTS

| | | |
|---|---|---|
| KR | 10-2019-009081 A | 1/2019 |
| KR | 10-2020-0005966 A | 1/2020 |
| KR | 10-2020-0072319 A | 6/2020 |

OTHER PUBLICATIONS

Jung et al., "Text information extraction in images and video—A survey", 2004. (Year: 2004).*
International Search Report and Written Opinion filed in PCT/US2021/058256 dated Feb. 24, 2022; 9 pages.

* cited by examiner

*Primary Examiner* — Nicholas R Wilson
(74) *Attorney, Agent, or Firm* — Vedder Price P.C.

(57) ABSTRACT

The present disclosure generally relates to systems and methods for creating, publishing, accessing, and sharing AR, VR, and/or XR content. In embodiments, users may collaborate in an XR environment. In embodiments, a system disclosed herein includes a backend module and a user client that permits creation and/or viewing of XR content. Embodiments enable users to create customized XR content that is published to users based on predetermined times and/or locations. Embodiments provide for training and collaborative XR environments accessed by multiple users simultaneously.

6 Claims, 27 Drawing Sheets

FIG. 16

TeamworkAR      JOIN A MEETING   HOST A MEETING   (Admin) TeamAr Admin⌄ ⌁

Rooms   People   Invitations   AR Experiences   Settings   User Management   Model Management   Video Management   Organization Management ⚙ Current Campaigns (2) *1702*       [+New AR Experience] *1714*

| Campaign | Type | Status | Views | Dates | Published | | |
|---|---|---|---|---|---|---|---|
| N/A | Model placement | Live *1712* | 2 | Oct 14 - Oct 17 | ◉ *1710* | Edit | Delete |
| N/A | Base Experience | | | Created Oct 14 2020 | *1706* | *1708* | |
| N/A | Model placement | Pending | 0 | N/A - N/A | ◎ | Edit | Delete |
| N/A | Base Experience | | | Created Oct 14 2020 | | | |

« ‹ 1 › »

⚙ Past Campaigns (10) *1704*

| Campaign | Type | Status | Views | Dates | Published |
|---|---|---|---|---|---|
| N/A | Image | Live | 0 | Oct 04 - Oct 04 | ◎ |
| N/A | Base Experience | | | Created Oct 14 2020 | |
| N/A | Model placement | Live | 0 | Oct 07 - Oct 07 | ◎ |
| N/A | Base Experience | | | Created Oct 14 2020 | |

FIG. 17

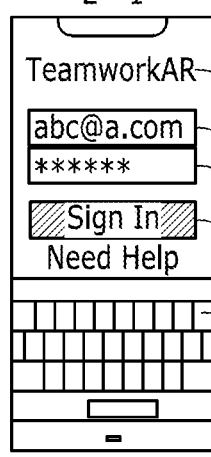
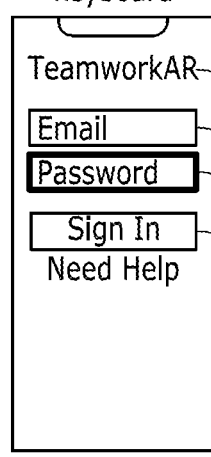
FIG. 28  FIG. 29  FIG. 30
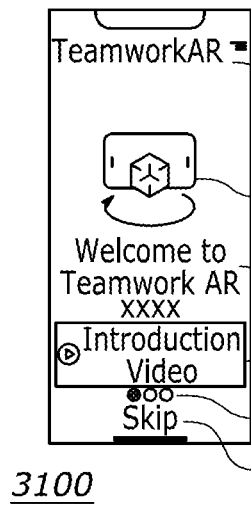
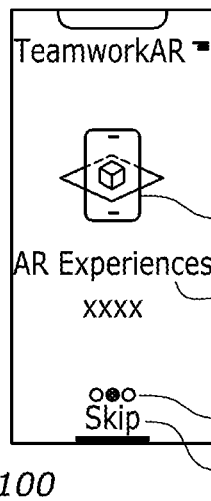
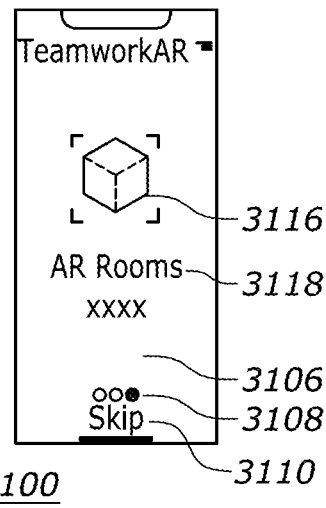
FIG. 31  FIG. 32  FIG. 33

SYSTEMS AND METHODS FOR INTEGRATING AND USING AUGMENTED REALITY TECHNOLOGIES

CROSS-REFERENCE TO RELATED APPLICATIONS

This application claims the benefit of and priority from U.S. Provisional Patent Application Ser. No. 63/110,281, filed on Nov. 5, 2020, the contents of which are hereby fully incorporated herein by reference.

BACKGROUND OF THE DISCLOSURE

The present disclosure generally relates to extended reality systems and methods of use thereof. More particularly, the present disclosure relates to systems and methods that provide for the creation, authoring, consumption, distribution, display, use, and tracking of extended reality content and experiences generally and augmented-reality content and experiences specifically.

Extended reality (XR) is a general term referencing experiences created from a combination of a real environment with virtual content, such as is created through human-machine interactions generated by computer technology (including wearables). Examples of XR include (i) augmented reality (AR), wherein a user's perception of objects that reside in the real world is enhanced by computer-generated perceptual information; (ii) virtual reality (VR), wherein an environment is simulated for a user; (iii) mixed reality (MR), wherein real and virtual environments are "mixed" to produce new environments and visualizations permitting physical and digital objects to co-exist and interact in real time; and (iv) hybrids, combinations, and variations of each of the foregoing. As such, XR encompasses everything from entirely "real" environments (which may be supplemented by "virtual" information) to entirely "virtual" environments (which may be based on or incorporate some "real" information).

Existing AR experiences typically involve enhancing real world objects with "virtual" or computer-generated perceptual information, through one or more of a user's senses (i.e., visual, auditory, haptic, somatosensory and olfactory). In addition, AR generally features real-time interaction and accurate representation of both virtual and real objects. This is typically accomplished constructively (by "overlaying" virtual information on top of a "real" environment) or "destructively" (by masking a portion of the real environment). For example, an AR experience may be provided through the use of goggles that are either constructive (superimposing additional virtual information on top of the user's perception of the real environment) or destructive (obscuring portions of the real environment). In this manner, the user experiences a seamless combination of the "real" and "virtual" environments. AR is largely synonymous with MR, although MR can encompass fully virtual environments in which "real" objects are also incorporated.

XR generally and AR specifically advantageously permit users to experience a blended perception that integrates information immersively with the real environment around them.

Despite the obvious practical applications of XR generally and AR specifically across a wide range of fields, existing technologies and solutions suffer from a number of significant drawbacks.

Many existing AR solutions are platform-dependent, requiring content that is created for a specific user device. This makes it difficult to widely deploy AR content, as the content must be re-authored for each separate platform that will be used to experience the content. Users are further "locked-in" to content created solely for their existing platforms, making transitions or upgrades more costly and time consuming, particularly where an existing AR content library must be adapted or "reauthored" for a new platform.

Content discovery is also lacking on existing platforms and technologies. Users must typically select specific content to display. This requires user education as to what applicable content may be available in different contexts and locations, creating a significant barrier to user adoption and obviating some of the efficiency gains that are provided by use of AR content through the increased time and effort required for users to find and obtain content relevant to particular contexts or locations.

Authoring AR content for existing systems is also a laborious and complicated process, typically requiring expert manual involvement to create content for each specific platform. This raises the barrier to entry and increases the costs and time required for a user to create custom AR content that may be relevant to that specific user.

Existing AR solutions are also not adaptable to incorporate new modalities or enable use of MR, VR, or other XR experiences. This limits the scope of experiences available to users, and limits the types of content that users can access without having to undertake complicated and/or expensive transitions to new or different platforms in order to access new content.

Therefore, there is a long-felt but unresolved need in the art for improved XR systems and methods generally, as well as improved AR systems and method specifically, that address the foregoing disadvantages as well as other disadvantages of existing technologies.

BRIEF SUMMARY OF THE DISCLOSURE

This summary is provided to introduce a selection of concepts in a simplified form that are further described in the detailed description of the disclosure. This summary is not intended to identify key or essential inventive concepts of the claimed subject matter, nor is it intended for determining the scope of the claimed subject matter.

Generally, a system as disclosed herein may include a backend module and a user client that permits creation and/or viewing of XR content.

An embodiment provides a system comprising a server comprising a database, one or more first processors and a first memory comprising first instructions, the server communicatively coupled to a user device; wherein the first instructions, when executed by the one or more first processors, cause the server to perform operations comprising: receiving, from the user device, a first command to create new AR content; displaying, via the user device, a first plurality of options each corresponding to a type of AR content; receiving, from the user device, a second command specifying a first one of the first plurality of options; generating an AR experience of the type corresponding to the first one of the plurality of options; and storing the AR experience in the database.

A further embodiment provides a system comprising: a user device; a server communicatively coupled to the user device and one or more databases, the server comprising one or more first processors and a first memory comprising first instructions; wherein the first instructions, when executed by the one or more first processors, cause the server to perform operations comprising: transmitting, to the user device, a first set of commands configured to cause the user device to generate a graphical user interface; receiving, from the user device, a first set of information; transmitting, to the user device, a second set of information from the one or more databases configured to cause the graphical user interface, to display an XR experience, wherein the second set of information is selected based at least in part on the first set of information; receiving, from the user device, a third set of information corresponding to one or more actions taken on the user devices while viewing the XR experience; and based on the third set of information, changing the contents of at least one of the one or more databases.

A further embodiment provides a method of displaying an XR experience, the method comprising the steps of: displaying, on a user device, a plurality of options each corresponding to an XR experience; receiving, from the user device, a selection corresponding to a first one of the plurality of options; displaying, on the user device, the XR experience corresponding to the selection, receiving, from the user device while displaying the XR experience, first sensor data corresponding to a position of the user device; receiving, from the user device while displaying the XR experience, second sensor data corresponding to a real world image proximate the user device; receiving, from the user device while displaying the XR experience, third sensor data corresponding to inputs provided to the user device; and adjusting the displayed XR experience based at least in part on the first sensor data, the second sensor data, and the third sensor data.

BRIEF DESCRIPTION OF THE SEVERAL VIEWS OF THE DRAWING(S)

The foregoing summary, as well as the following detailed description of the disclosure, is better understood when read in conjunction with the appended drawings. For the purpose of illustrating the disclosure, exemplary constructions of the inventions of the disclosure are shown in the drawings. However, the disclosure and the inventions herein are not limited to the specific methods and instrumentalities disclosed herein.

FIG. 1 exemplarily illustrates a block diagram of a method of creating AR content in accordance with an embodiment.

FIG. 2 exemplarily illustrates a block diagram of a method of preparing AR content in accordance with an embodiment.

FIG. 3 exemplarily illustrates a diagram of a system for tracking and reporting information in accordance with an embodiment.

FIG. 4 exemplarily illustrates a block diagram of a system in accordance with an embodiment.

FIGS. 5a-5c exemplarily illustrate user interfaces for software for displaying AR content in accordance with an embodiment of the invention.

FIG. 6 exemplarily illustrates a block diagram of a method of creating AR content in accordance with an embodiment.

FIG. 7 illustrates an exemplary process creation flow using the cloud editor in accordance with an embodiment.

FIG. 8 an exemplary process flow for creating a geo-located AR experience in accordance with an embodiment.

FIG. 9 an exemplary process flow for viewing a geo-located AR experience.

FIG. 16 illustrates an exemplary user interface for choosing a publication time frame for an AR experience in accordance with an embodiment.

FIG. 17 illustrates an exemplary user interface for reviewing existing AR campaigns in accordance with an embodiment.

FIGS. 28 through 44 depicts exemplary illustrations of a user interface for a mobile application in accordance with an embodiment.

DETAILED DESCRIPTION OF THE DISCLOSURE

Figure 1:
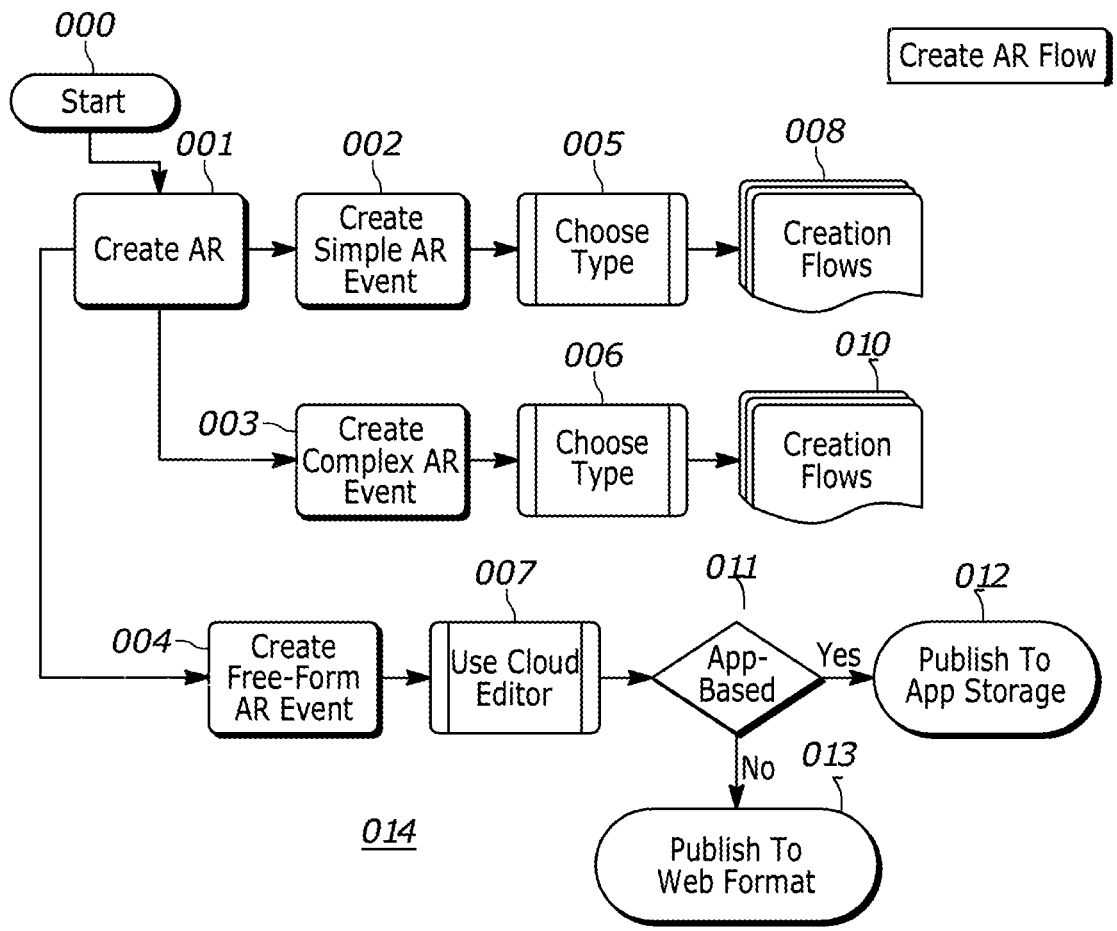

The following disclosure as a whole may be best understood by reference to the provided detailed description when read in conjunction with the accompanying drawings, drawing description, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

Overview of the TeamworkAR™ System.

Embodiments of the present disclosure relate to improved XR systems and methods termed the "TeamworkAR™ System." As used herein, the term "AR" may encompass any form of XR (although AR is specifically contemplated) unless otherwise expressly noted. In exemplary embodiments, the TeamworkAR™ System comprises a hardware platform or device on which a software application (termed the "User App") is run, a cloud dashboard permitting configuration of the system, one or more experiences that may be hosted remotely from the User App or incorporated locally therein, a learning record store (LRS) databases for online and offline tracking and reporting, and one or more communication channels (including video, audio, and/or text). The User App operates on a local device and may include variation optimized for different platforms (such as iOS, Android, browser based, and wearables (such as the Realwear HMT-1 and Microsoft HoloLens)). In an embodiment, content created for the User App is platform agnostic, and capable of display and interaction with User Apps running on different devices. In embodiments, the capabilities of the User App are automatically enabled or disabled based on the features of the platform on which it runs, with the same content automatically adjusted based on the available capabilities.

Figure 4:
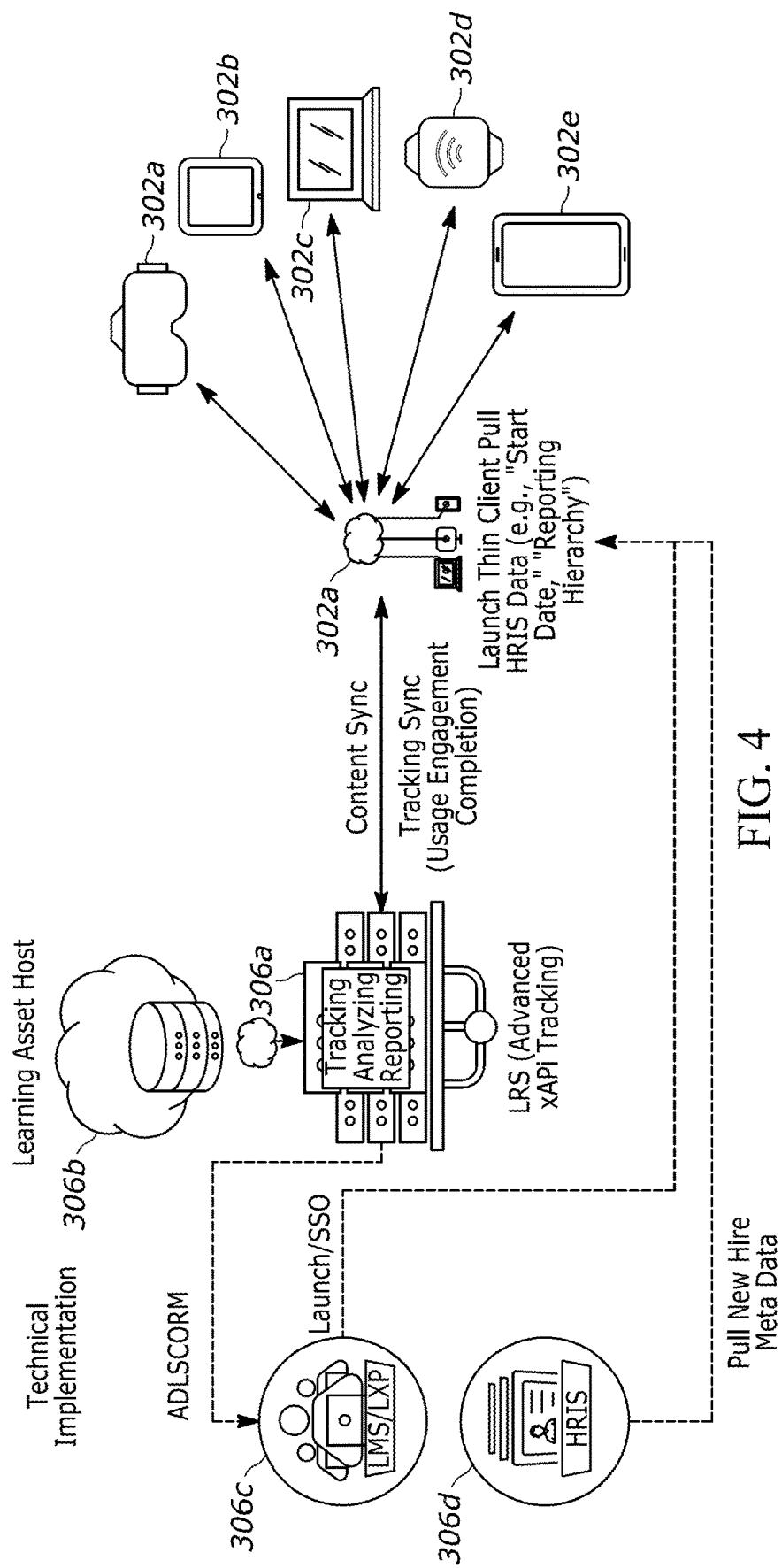

FIG. 4 illustrates an exemplary embodiment of the TeamworkAR™ System. As shown, one or more devices 302 (such as a headset 302a, a tablet 302b, a computer 302c, a smart watch 302d, and a smartphone 302e) access a cloud-based "thin" client 304. In an alternative embodiment, the devices 302 instead utilize a locally run User App instead of the thin client 304. Information in the thin client 304 or User App is synchronized with one or more databases 306. As shown, the databases 306 comprise a LRS 306a coupled to a separate learning asset host database 306b, a LMS/LPX database 306c, and a HRIS database 306d. These databases 306 allow information to be obtained from and shared with various outside systems.

Embodiments include a User App that is configurable to function across multiple devices (including smartphones, laptops, tablets, wearables, and other computing technologies). In embodiments, the User App provides users thereof with access to self-guided assistance in an AR setting, providing utility in a wide variety of fields including entertainment, technical design and engineering, help-desk settings, and providing general training and support. The User App is configured to work in widely disparate settings and fields based on the specific content provided through the User App. In an embodiment, the User App is configured to run on a standard web browser. In an embodiment, the User App is configured to automatically enable and disable capabilities based on the specific sensors, displays, and other hardware features of the device on which the User App is run.

Embodiments include authoring software which allows operators to create, customize, and activate XR experiences. These XR experiences may be automatically customized by the User App depending on whether it is run from the web, a mobile device, or a more capable hardware platform. In embodiments, backend software is provided that includes an application programming interface (API) that is accessible from User Apps running in both web clients as well as on other platforms.

In an embodiment, users of the User App may be placed in groups (termed organizations), with each organization able to separately subscribe to XR content experiences. In an embodiment, authoring software employs robot process automation to transform large collections of pre-existing content into AR or XR experiences. This includes scripted photogrammetry conversion, object transcoding and conversion, and deployment across multiple channels, such as web-based or through a mobile app.

In embodiments, systems employ a variety of AR technologies, geo-location placement, computer vision, feature-point collection, feature-point retrieval, and learning records stores (LRS) in accordance with the xPAI eLearning specification to empower individuals to interact with artifacts in an AR experience and be able to validate the learning actions of the user on the AR artifact, and be able to report those actives to a data reporting repository.

Embodiments provide users with the ability to create AR objects and images from various forms of graphics text, and video, including JPEG, MP4, and 3D models, and place them via location identifiers into real locations. Embodiments permit the bulk ingestion of data, which are then automatically converted and placed as AR content that is geo-tagged to a corresponding real word location. By tracking a user's real world location, appropriate AR content may then be displayed to the user through the User App.

Cloud Dashboard

Embodiments provide a web-based cloud platform through which users may manage content, experiences, and create new AR content for distribution. In an embodiment, the cloud dashboard enables users to upload media (including, pictures, video, and 3D models), convert the media to XR and/or AR content, and distribute such content to members of their organization. In an embodiment, the cloud dashboard enables users to search for and locate new XR and/or AR content based on specific geo-locations. In an embodiment, the cloud dashboard permits users to discover new XR and/or AR content via point cloud database (such as a virtual digiboard, navigation wayfinder). In an embodiment, the cloud dashboard enables users to engage in web-based teleconferencing with other users through XR and/or AR tools. In an embodiment, the cloud dashboard enables users to store and retrieve video experiences to and from the cloud platform. In an embodiment, the cloud dashboard enables users to invite others to connect (e.g., by email or direct account assignment). In an embodiment, the cloud dashboard enables users to integrate workflow into popular IT service management (ITSM) software like ServiceNow™. In an embodiment, the cloud dashboard enables users to get detailed reports via Tableau and other rich reporting tools.

In an embodiment, the cloud dashboard enables users to employ existing content management system (CMS) tooling to manage users, roles, and organization structures. In an embodiment, the cloud dashboard enables designated users to push certain XR and/or AR content to other members of their organization.

In embodiments, the features of the cloud dashboard may also be provided locally (such as through the User App).

Figure 10:
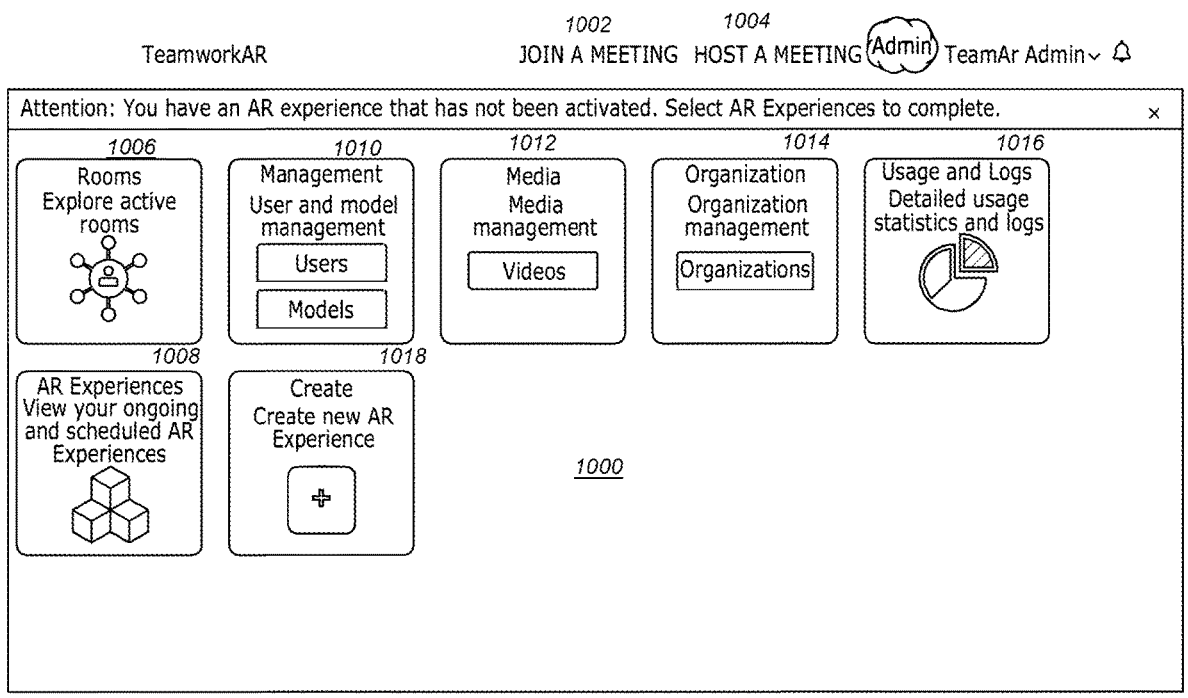
FIG. 10 illustrates an exemplary user interface of an embodiment of the cloud dashboard in accordance with an embodiment.

FIG. 10 illustrates an exemplary user interface 1000 of an embodiment of the cloud dashboard in accordance with an embodiment of the present disclosure. As shown, users are presented with options to "join a meeting" 1002 or "host a meeting" 1004 (with such meeting enabled with XR and/or AR capabilities as discussed herein). Users can further explore active "rooms" or XR and/or AR experiences currently viewed by other users 1006, manage users within their organization and/or models available to the user 1010, manage media (such as video) available to the user 1012, manage the organizations to which the user is a member 1014, view usage logs 1016, manage existing AR experiences to which the user has access 1008, and create new AR experiences 1018.

Figure 18:
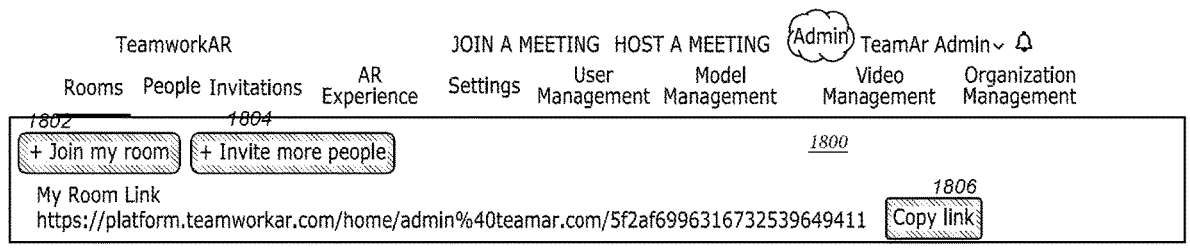
FIG. 18 illustrates an exemplary user interface of the "rooms" tab in accordance with an embodiment.

FIG. 18 illustrates an exemplary user interface 1800 of the "rooms" tab. As shown, users may either join 1802 a personal "room" (wherein a desired AR experience may be displayed) or invite 1804 others to join their room. Invitations can be sent through the cloud dashboard or by providing another user with a direct link 1806.

Figure 19:
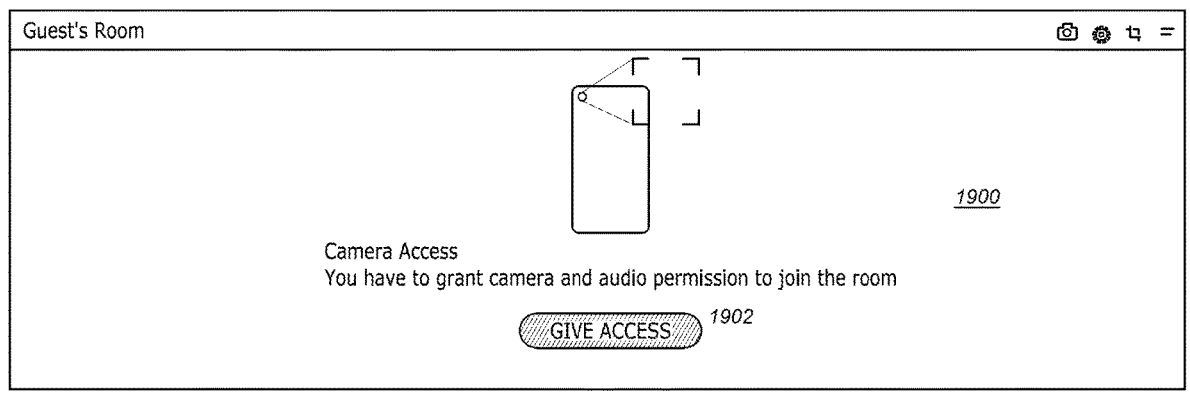
FIG. 19 illustrates an exemplary user interface of the loading screen when viewing another user's room through a desktop client in accordance with an embodiment.

FIG. 19. illustrates an exemplary user interface 1900 of the loading screen when viewing another user's room through a desktop client. As shown, the user joining the room may choose to give the software access to the camera 1902 on his or her local device in order to enable video participation and/or the display of AR content that incorporates aspects of the user's real world environment. An alternative embodiment of this user interface on a smartphone is illustrated in FIG. 5*b*.

Figure 5A:
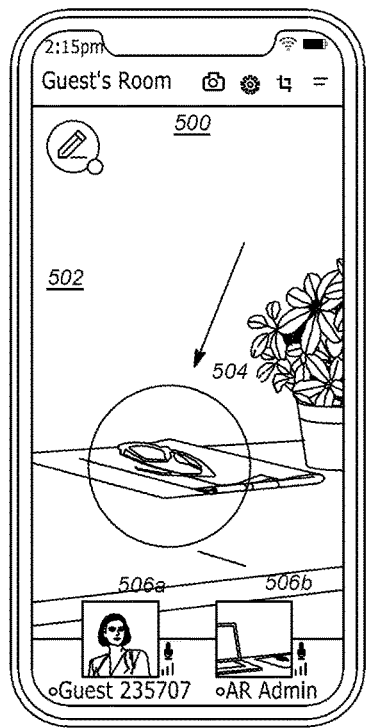
Figure 5B:
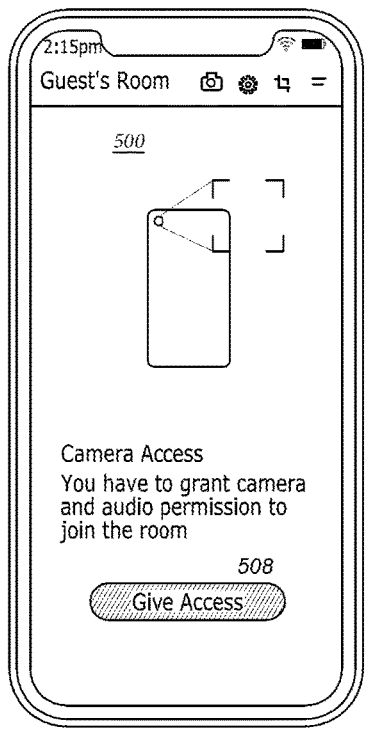
Figure 5C:
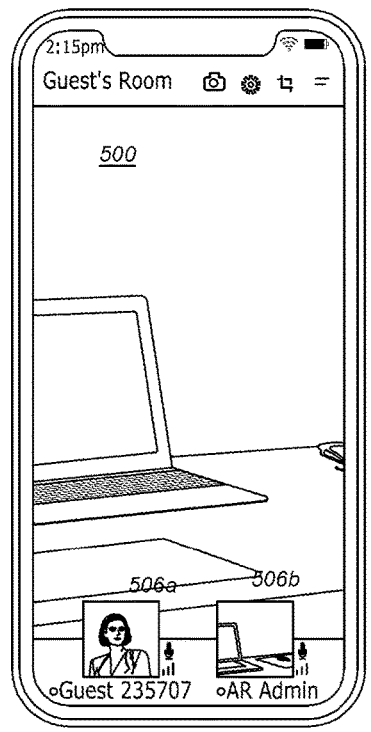

FIGS. 5*a* through 5*c* illustrate a user interface 500 on a smart phone. As shown in FIG. 5*a*, while in a room, all users may view the same real world environment 502 and create AR annotations 504 visible to the other users. Users may simultaneously communicate via audio, video, and/or text; video feeds 506*b* and/or user icons 506*a* are displayed simultaneously with the rest of the interface. As shown in FIG. 5*b*, a user may be prompted to give camera access 508 in order to share video with other users. As shown in FIG. 5*c*, addition of AR content is not required, as users can instead choose to share only the real environment (or only audio, video, and/or textual information). As well, users can move augmented reality content (scale, rotate, and translate) together in real time via a media synchronization system built into all the mobile and web applications.

Creation of AR Content.

In the embodiment shown, content creation is controlled by a platform create module and a cloud editor. In an embodiment, the types of content that may be created by the platform create module are categorized as either "base experiences" (or "basic experiences") or "advanced experiences." The cloud editor allows animated free-form creation of bespoke AR content to be created and deployed.

FIG. 1 depicts an exemplary block diagram of a method 014 of creating AR content. As shown, the method starts at step 000. At step 001, the user logs into system and selects a "create" option. The user then selects to either create a simple (or basic) AR event 002, create a complex (or advanced) AR event 003, or create a free-form AR event 004. If the user selects a simple event 002 or complex event 003, the user then is presented with predetermined options for the type of desired content 005, 006 before proceeding to the creation flows 008, 010 (as shown on FIG. 2). Each of these options is discussed in greater detail below. For free-form AR events, the user is taken to the cloud editor 007 (as discussed below), whereupon a determination is made as to whether the content is to be app based 011 or online-based, before ultimately publishing the newly created content to local storage 012 and/or a web-based format 013.

Figure 11:
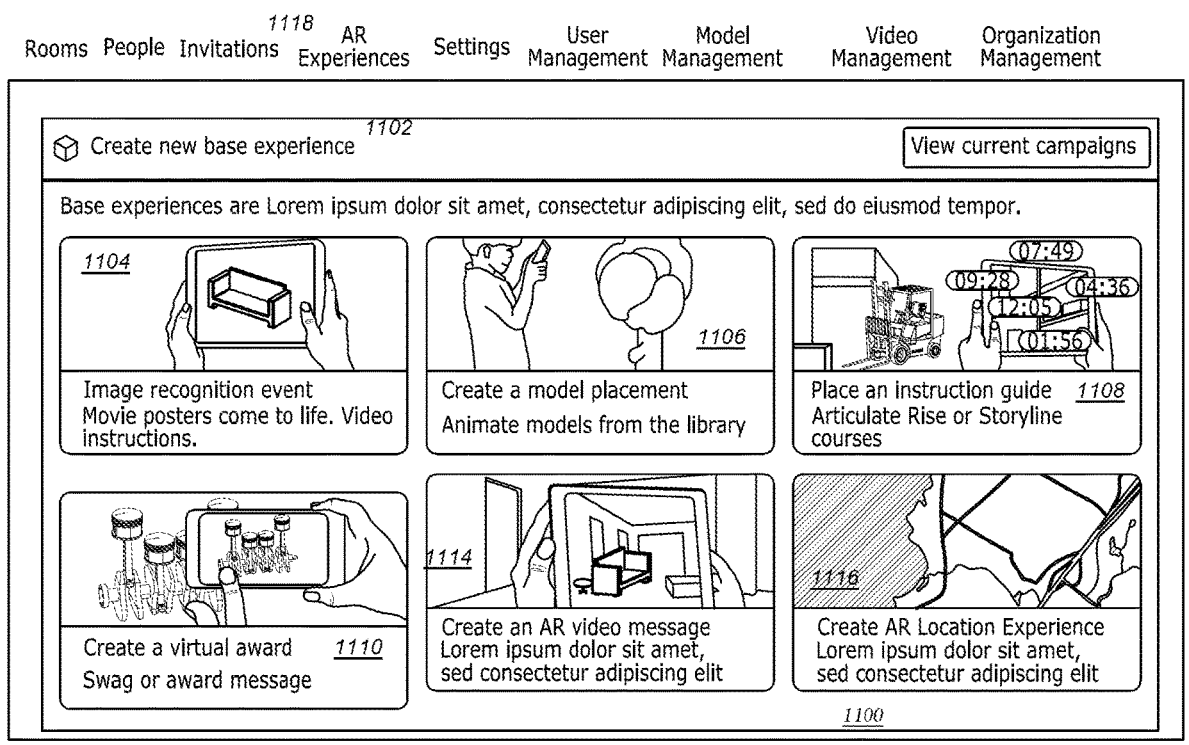
FIG. 11 illustrates an exemplary user interface of the platform create module when creating a "base experience" in accordance with an embodiment.

FIG. 11 illustrates an exemplary user interface 1100 of the platform create module when creating a "base experience" 1102. Basic experiences are simple, modular AR experiences like recognizing an image or item with a camera and presenting an AR experience based on recognition of the image. In the embodiment shown in FIG. 11, the base experiences available are an image-recognition event (i.e., recognizing an image obtained from a camera and/or otherwise uploaded to the system) 1104; creating a model placement (i.e., placing an existing model in an AR experience) 1106; placing an instruction guide (i.e., placing an existing guide in an AR experience) 1108; creating a virtual award 1110; creating a virtual video message (i.e., a recorded video that may include AR content) 1112; and creating an AR location experience (i.e., an AR experience that is triggered when a user is at a physical, real world location) 1114. In an embodiment, the system takes simple multimedia (such as pictures, videos and 3D models) and packages them as discoverable AR experiences. These experiences can be authored to provide "call to action" buttons and are trackable. As shown, users can access a top-level menu 1118 with option to view rooms, people, invitations, AR experiences, settings, user management, model management, video management, and organization management. Further, users have the option to create view current campaigns 1120.

Figure 2:
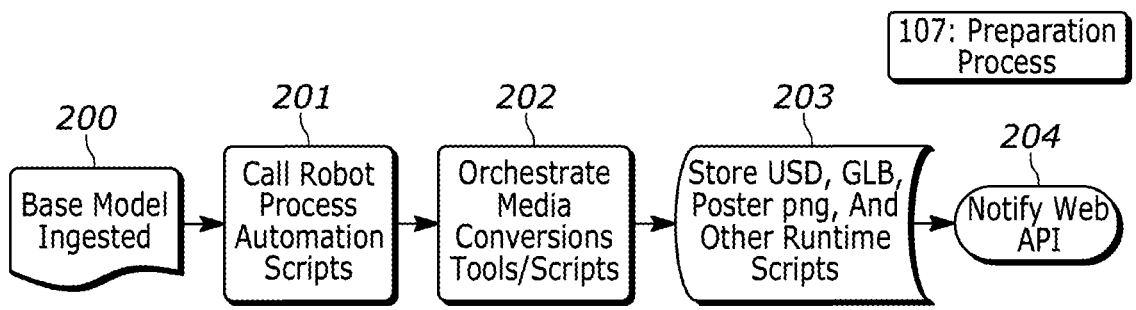

FIG. 2 depicts an exemplary high level process creation flow for ingested content. The method begins by ingesting the base model at step 200. Next, one or more RPA scripts are called at step 201. At step 202, media conversion is effectuated through the use of one or more tools and scripts. At step 203, content is stored in an applicable format. At step 204, the web API is notified that the process has completed.

Figure 6:
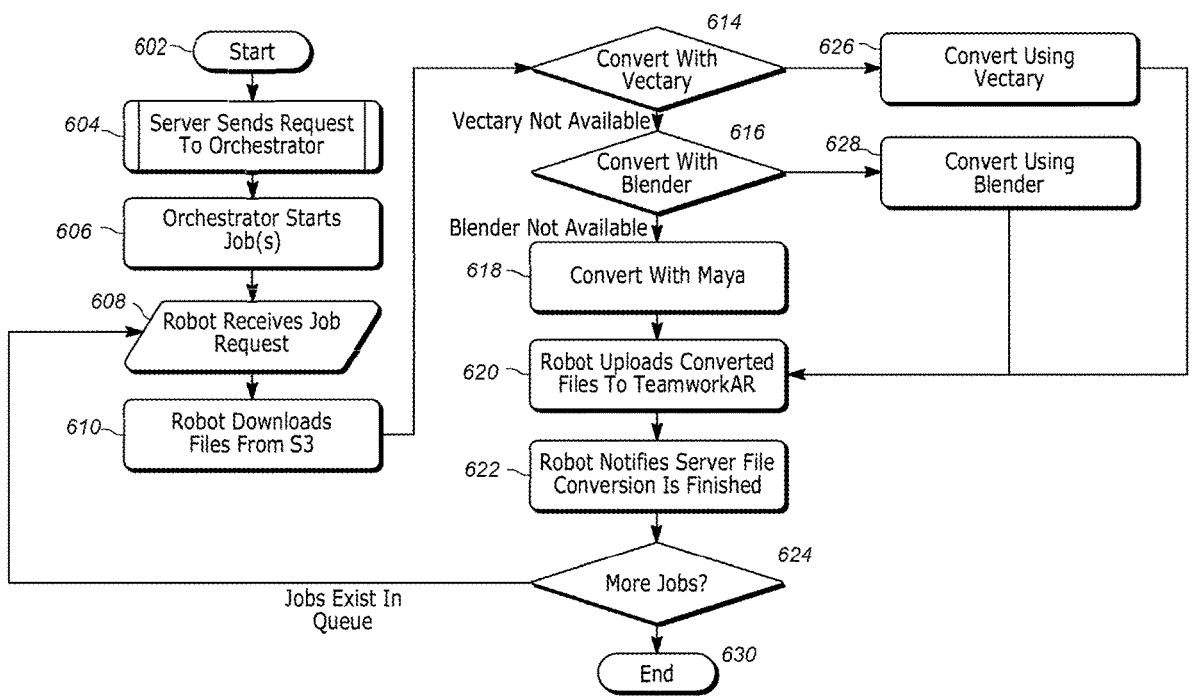

FIG. 6 depicts a specific exemplary process creation flow 600 for ingested content. As shown, the method begins at step 602. At step 604, the server sends a start job request to an "orchestrator" process after a user uploads a file to convert to AR content. At step 604, the orchestrator module begins one or more conversion job(s) with the input from the server (such as file name, file location, etc.). At step 606, the RPA job commences with input from the orchestrator. At step 608, the robot receives the job request before the RPA job downloads requested file from S3 at step 610. At step 614, a decision is made whether to convert using Vectary (e.g., checking whether Vectary is available); if so, the conversion occurs at step 626 before the robot uploads the converted file(s) at step 620. Otherwise, a decision is made at step 616 whether to convert using Blender (e.g., checking whether Blender is available); if so, the conversion occurs at step 628 before the robot uploads the converted file(s) at step 620. If Blender is not available, the conversion occurs using Maya at step 618 before the robot uploads the converted file(s) at step 620. As will be clear to one of skill in the art, other third-party model software may be used in place of those indicated and additional (or fewer) checks may be made. In each instance, the conversion step 618, 626, 628 involves importing the file(s), selects the appropriate file type to convert to, and exporting the file(s)(as appropriate). At step 622, the RPA job notifies the system that the conversion is finished. A check is performed at step 624 for any additional jobs, and if none, the method ends at step 630.

Figure 12:
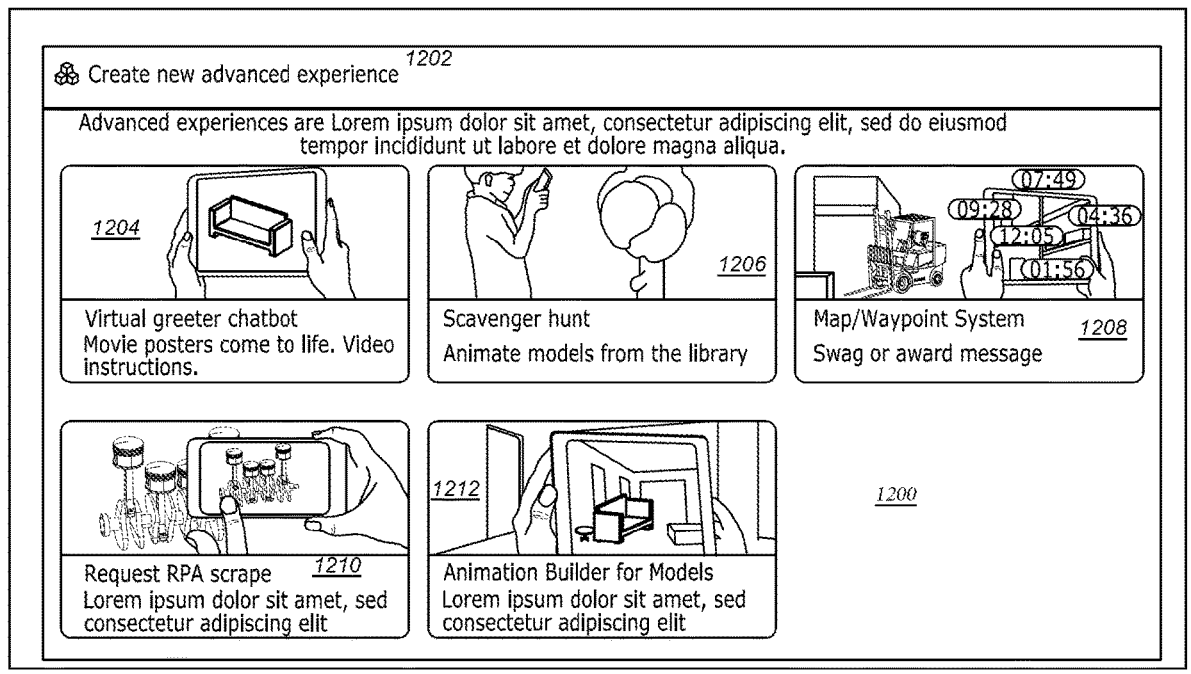
FIG. 12 illustrates an exemplary user interface of the platform create module when creating an "advanced experience" in accordance with an embodiment.

FIG. 12 illustrates an exemplary user interface 1200 of the platform create module when creating an "advanced experience" 1202. Advanced experiences are compound experiences that may be tailored for more particular user needs. In the embodiment shown, the advanced experiences include creating a chatbot 1204; creating a scavenger hunt 1206; creating a map waypoint system 1208; requesting a robotic process automation (RPA) scrape (i.e., using RPA automation to obtain information, such as from one or more websites) 1210; and creating a custom animation (which invokes the cloud editor) 1212.

In an embodiment, AR content and experiences are authored in a device-agnostic way. This permits the AR content to be accessed on any devices capable of running the User App. Location information (including GPS and elevation) may be captured using whatever sensors are provided on the device. For users on devices lacking appropriate sensors, information can be provided manually (such as by picking or setting an altitude, including through providing information such as "I am on the 34th floor of Comcast Center"). Automated tools can the available information and automatically translate it to the desired geolocation data, or involve a human operator for assistance with the needed translation. Where further sensors are available (such as a barometer altitude), this can be used directly to pinpoint the user's location.

Through this approach, users may precisely associate arbitrary AR experiences with specific real world locations. This enables the creation of subscription services that advertise to others or allow specificity/time-bound experiences. Further, content may be delivered with specificity, providing better integration into placement zones (e.g., multiple items, physical location assets, temperature of lights). In an embodiment, AR content and experiences are coded with geographic information (such as latitude, longitude, and/or altitude information); this geographic information is then used by the cloud dashboard and/or User App to associate the AR content and experiences with a desired real world location. In an embodiment, AR content and experiences are triggered when the device running the cloud dashboard and/or User App approaches the real world location identified by the geographic information and the AR content and experience is displayed only at the real world location. In an embodiment, each instance of the cloud dashboard and/or User App is able to communicate with every other instance within a certain proximity, enabling all such instances to share event location and information in real spaces such that interactions between instances are enabled, allowing for a common experience across instances.

In an embodiment, the cloud dashboard and/or User App is capable of authoring AR experiences (including specific placement, type, and content) from any device configured to either the cloud dashboard or run the User App. In embodiments, AR experiences are authored using open standards (such as GeoPose, Machine Readable World, and Spatial Discovery Service).

In an embodiment, the cloud dashboard and/or User App is configured to work with ARKit and ARCore. Content creators may access multiple values via light estimation, including a light intensity value and an average color tone value. In an embodiment, post-processing effects in Unity 3D are used to improve placement and visual readability of AR content and experiences.

The following describes an exemplary process in accordance with an embodiment for creating a location-based AR experience. Such location-based experiences may be discoverable only to users physically located in the specified location. Locations may be specified with granular detail, including through use of longitude, latitude, and altitude. In embodiments, locations may be specified through other geo-location means, such as requiring a local device to be connected to a particular wired or wireless network, or to receive a signal from a transmitter (such as an RFID tag).

Figure 13:
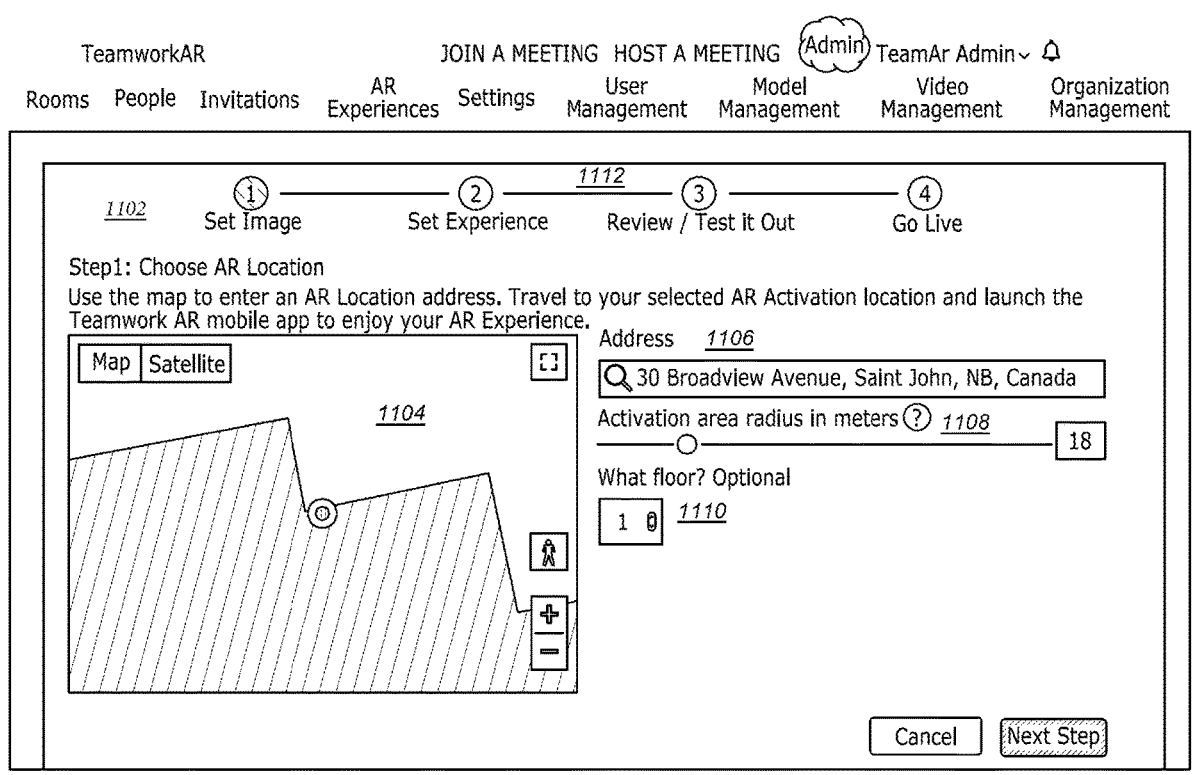
FIG. 13 illustrates an exemplary user interface for choosing an AR location in accordance with an embodiment.

As shown in FIG. 13, a user first chooses an AR location 1102 by using a map 1104, entering an address 1106 (which, in the embodiment show, optionally includes a floor 1110 of a building), or physically travelling to the location before accessing the User App or the cloud dashboard. The user may define a specific radius 1108 within which the AR location will apply. The user interface includes indicators 1112 1112 indicating the progress made towards deploying or "going live" with the experience.

Figure 14:
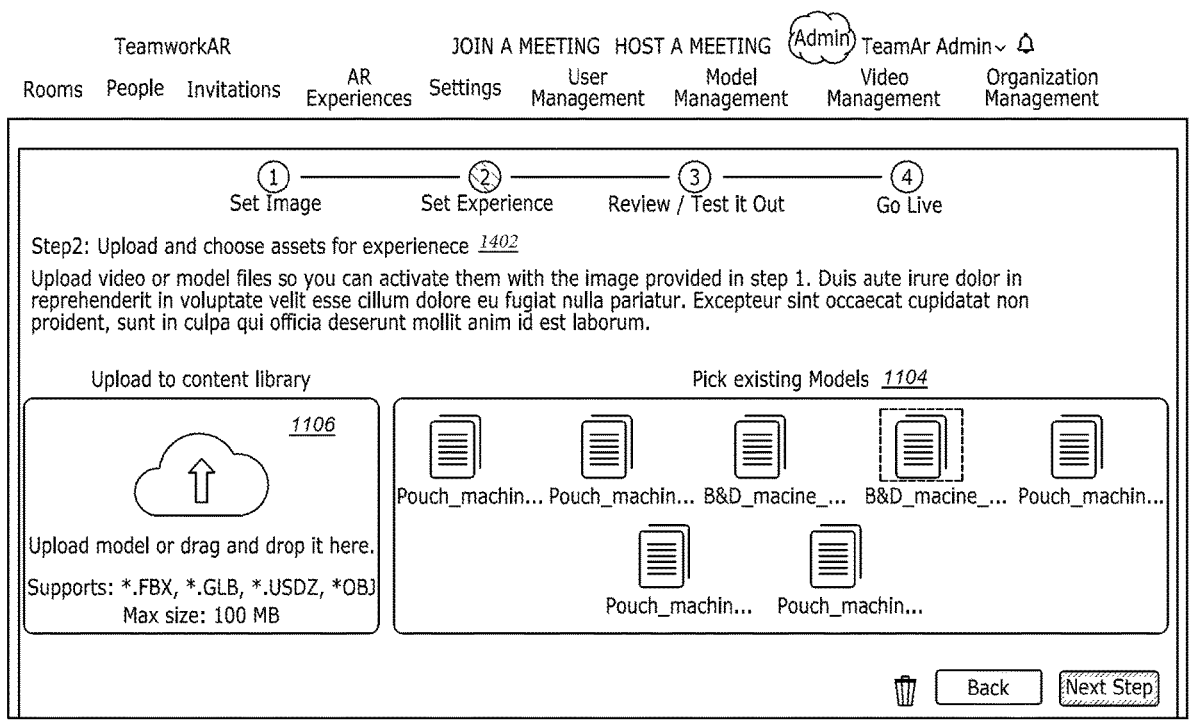
FIG. 14 illustrates an exemplary user interface for uploading assets in accordance with an embodiment.

As shown in FIG. 14, the user next uploads new assets 1402 and/or selects previously provided assets 1106 for the experience. In the embodiment shown, assets are uploaded by dragging and dropping them on a specified area. As will be clear to one of skill in the art, alternative approaches to this user interface may be used (such as opening a file browser).

Figure 15:
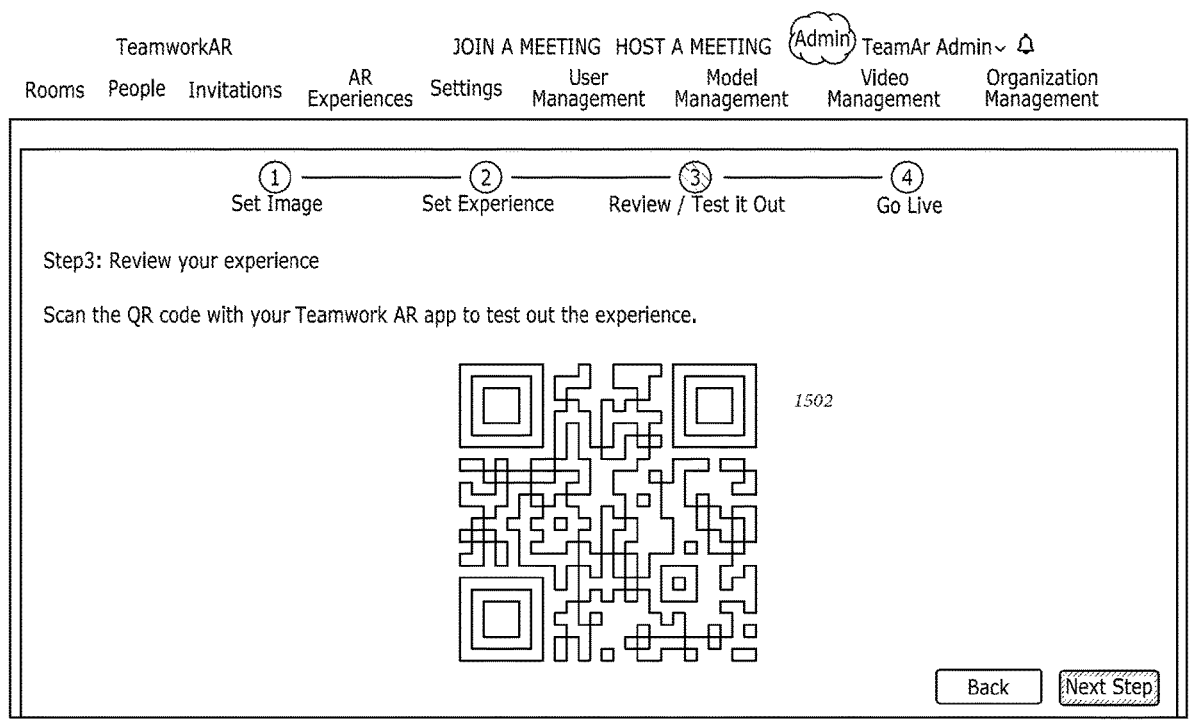
FIG. 15 illustrates an exemplary user interface for reviewing or previewing an AR in accordance with an embodiment.

As shown in FIG. 15, the user can then preview the experience. In the embodiment shown, the user can scan the presented QR code 1502 using a local device running the User App and having a camera or scanner to automatically engage the experience without having to physically travel to the location associated with the experience. This permits users located remotely from a physical location to create and test experiences for that location.

Figure 16:
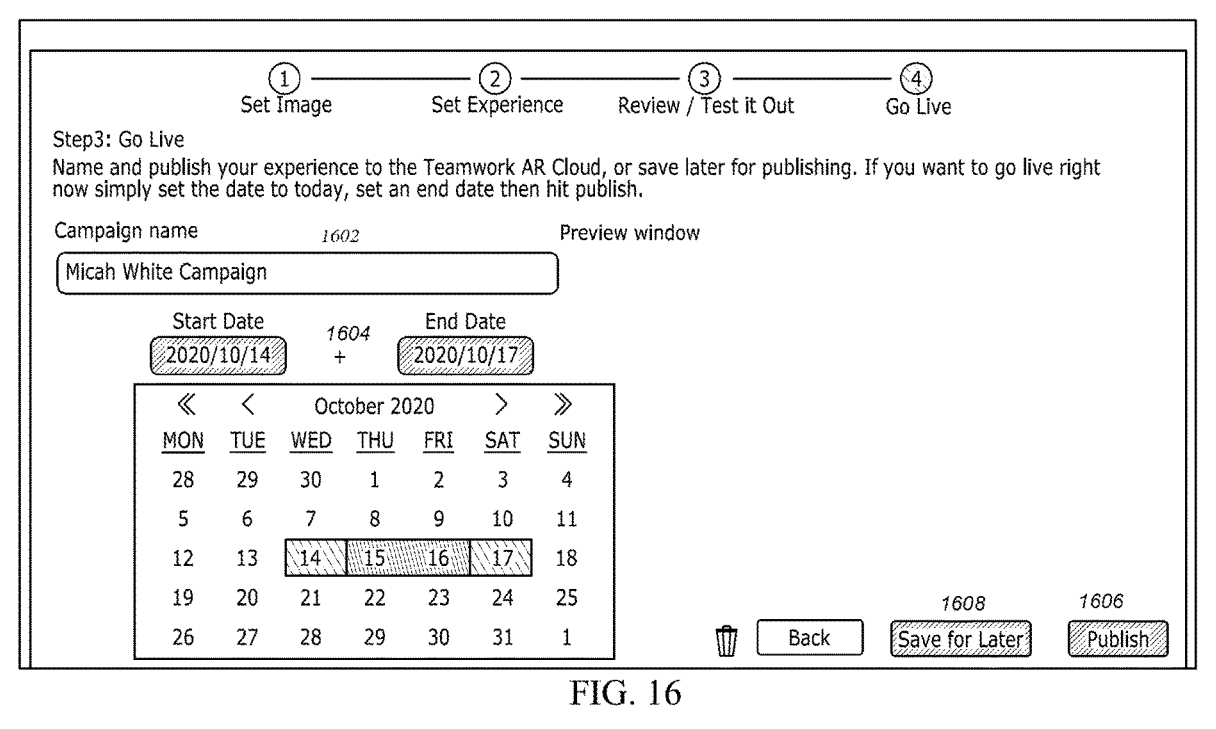

Once the experience is completed and no further changes are needed, as shown in FIG. 16, a user can then specify a name 1062 and choose a time period 1604 over which the experience will be available. The user may publish the experience 1606 or choose to save the experience for later 1608 (without publishing it to other users). This permits users to launch time-and-location-based campaigns that automatically expire and are only available to users at specific, real world locations.

As shown in FIG. 17, a user can review all active campaigns (i.e., experiences currently published to other users) 1702, inactive campaigns (i.e., experiences no longer published) 1704 and revise 1706 or delete 1708 them as needed. In an embodiment, campaigns can be published or deactivated with a single toggle 1710. Details 1712 regarding each campaign are provided, including the type, status, number of views, dates active, and publication status. New AR experiences can also be created 1714 as discussed here.

Figure 8:
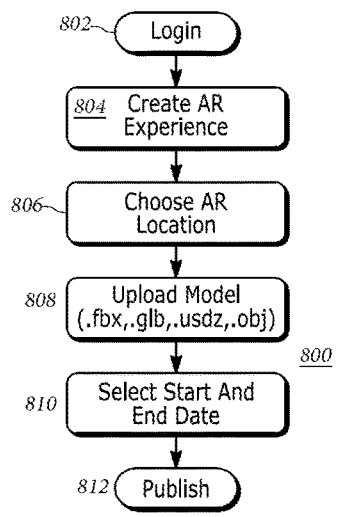

FIG. 8 depicts an exemplary process flow 800 for creating a geo-located AR experience. The process begins at step 802 as the user logs in and creates an AR experience at step 804. The user then chooses a geolocation (as discussed above) for the experience at step 002. The user can customize the precise location (in 3D space) in which each element of the model will appear before selecting a start and end date (if desired) for the experience to be available.

Figure 9:
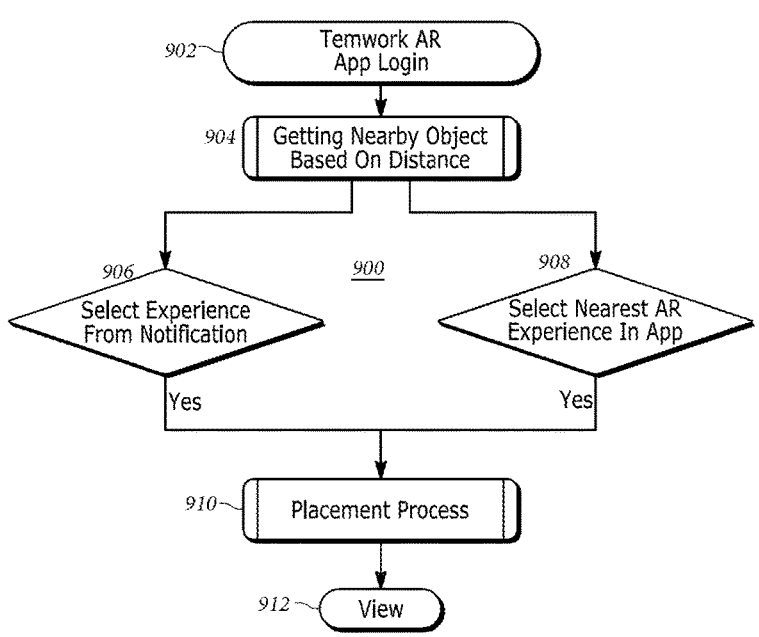

FIG. 9 depicts an exemplary process flow 900 for viewing a geo-located AR experience. The user begins at step 902 by logging in. The system then obtains information for nearby objects and/or AR experiences at step 904. A user can choose to either view the nearest experience (or any experiences of which the user is in range) at step 906 or select one or more experiences from a menu at step 908. At step 910, the selected experiences are either accessed (if already locally cached) or downloaded and placed in virtual space around the user. The user can then view the experience at step 912 by moving the user's device to display various portions of the real and virtual environments.

Figure 20:
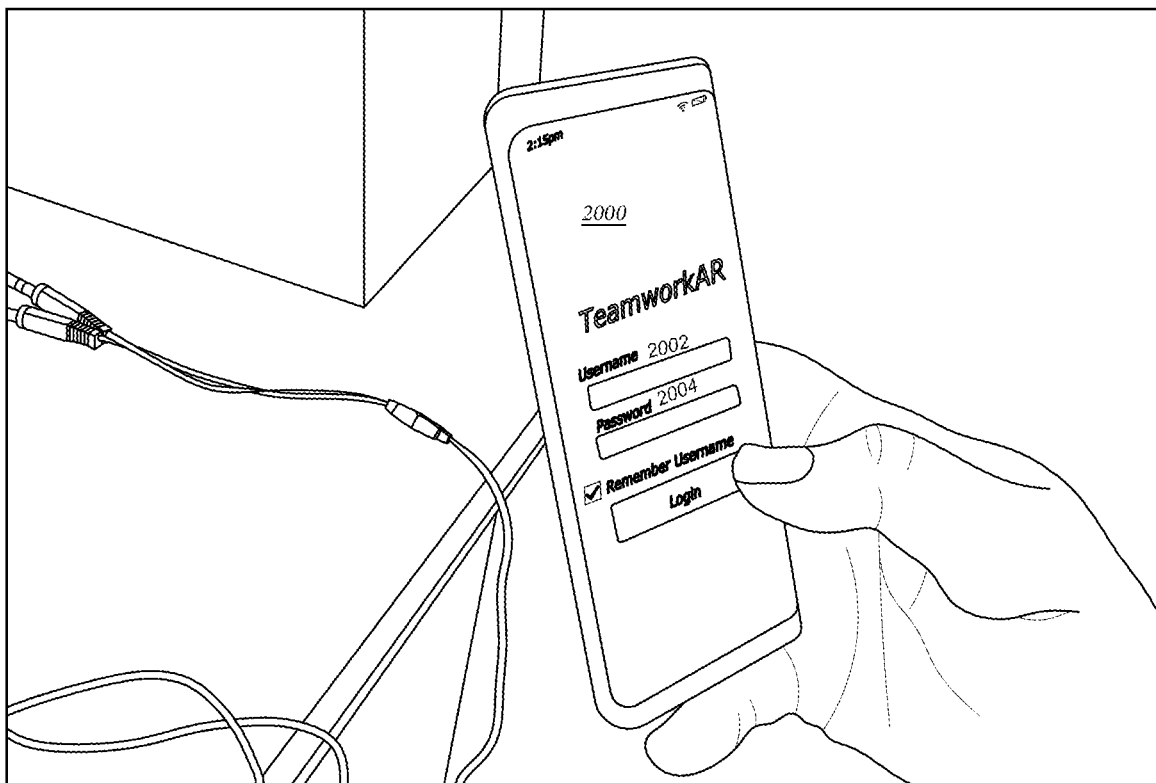
FIG. 20 illustrates an exemplary user interface of the User App running on a smartphone at the login screen in accordance with an embodiment.

FIG. 20 illustrates an exemplary user interface 2000 of the User App running on a smartphone at the login screen. In the embodiment shown, in order to access the User App, the user must enter his or her credentials (shown as comprising a username 2002 and password 2004, although other credentials may be used) which are then confirmed via a credential database stored either locally or remotely.

Figure 21:
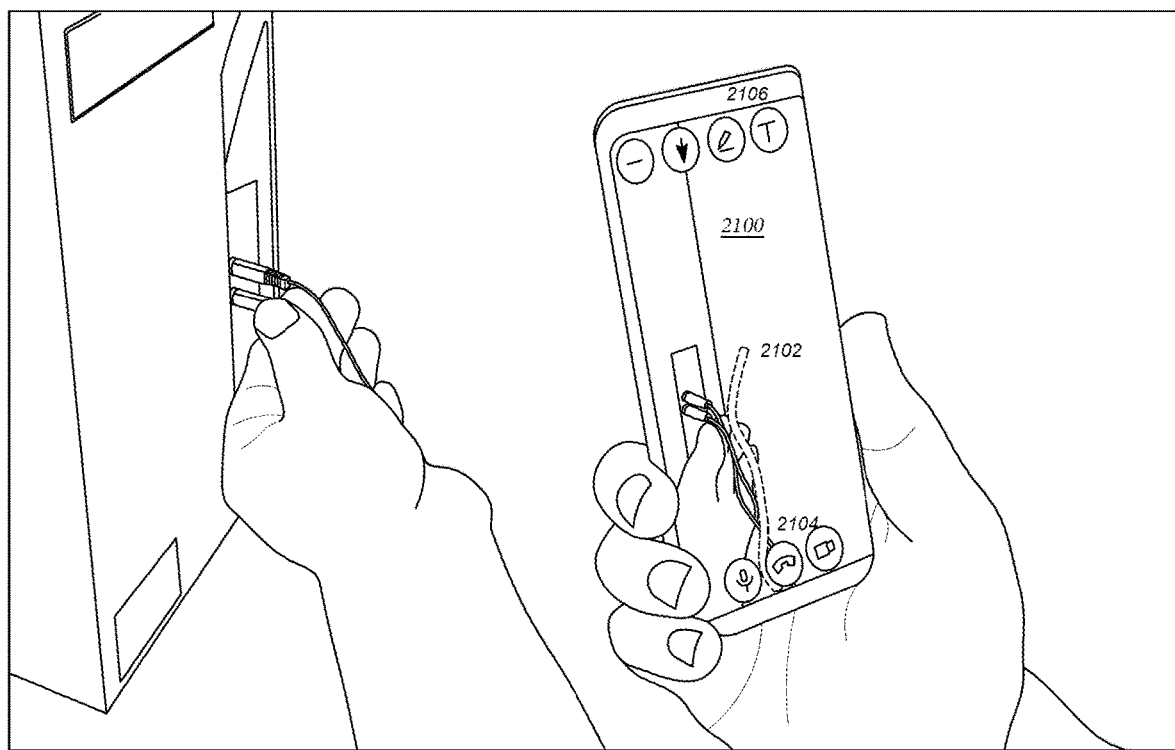
FIG. 21 illustrates an exemplary user interface of the User App while working with an AR experience in a room in accordance with an embodiment.

FIG. 21 illustrates an exemplary user interface 2100 of the User App while working with an AR experience in a room. A shown, AR content 2100 (here, annotations shown in dashed lines) are shown directing the user as to how to interact with the real world (i.e., by removing a specific wire). The user can leave the room by "hanging up" and has the option to disable audio and/or video sharing with another member of the room using a menu 2104. Users can create AR annotations using the tools 2106 provided at the top of the screen, with those annotations then visible to other users in the same room. In the embodiment shown, the room displays the real environment of one user through the camera on that user's device to all other users in the room. Those other users can then provide AR annotations while also communicating via audio, video, and/or text. This enables remotely located users to guide one another through complex, real world operations.

Figure 22:
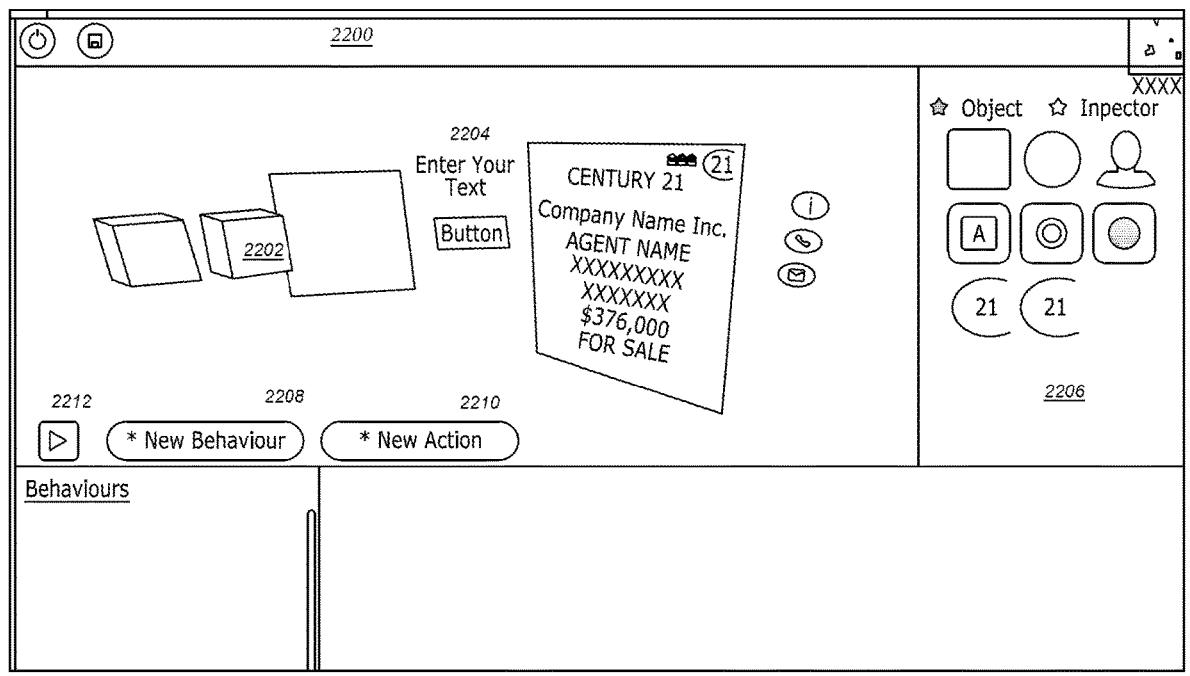
FIG. 22 illustrates an exemplary user interface of the cloud creation editor in accordance with an embodiment.

FIG. 22 illustrates an exemplary user interface 2200 of the cloud creation editor. As shown, a user may place one or more objects 2202 which can then be animated. Text 2204 may be added to the objects or displayed as annotations in the AR experience. Each virtual item may be separately manipulated and/or animated using the provided tools 2206. New behaviors 2208 and actions 2210 may be created, and the animations may be previewed 2212

Figure 23:
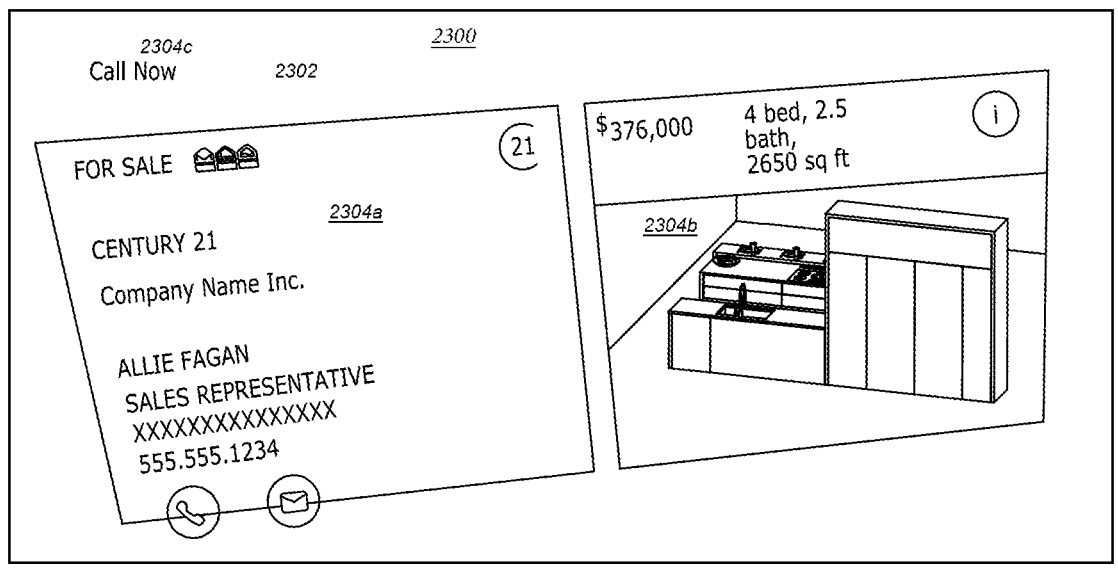
FIG. 23 illustrates the exemplary AR experience created in FIG. 22 in accordance with an embodiment.

FIG. 23 illustrates the exemplary AR experience 2300 created in FIG. 22. As shown, text 2304c and images 2304a, 2304b are configured to be superimposed over a real world environment 2302 at a specific real world location. Users can then interact with the AR content (such as by calling or emailing the indicated real estate agent) using hyperlinks included in the AR content. Similarly, hyperlinks in the AR content permit the user to obtain more information (such as by accessing a website or engaging in a more elaborate AR experience, such as by touring a property in a virtual environment).

Figure 7:
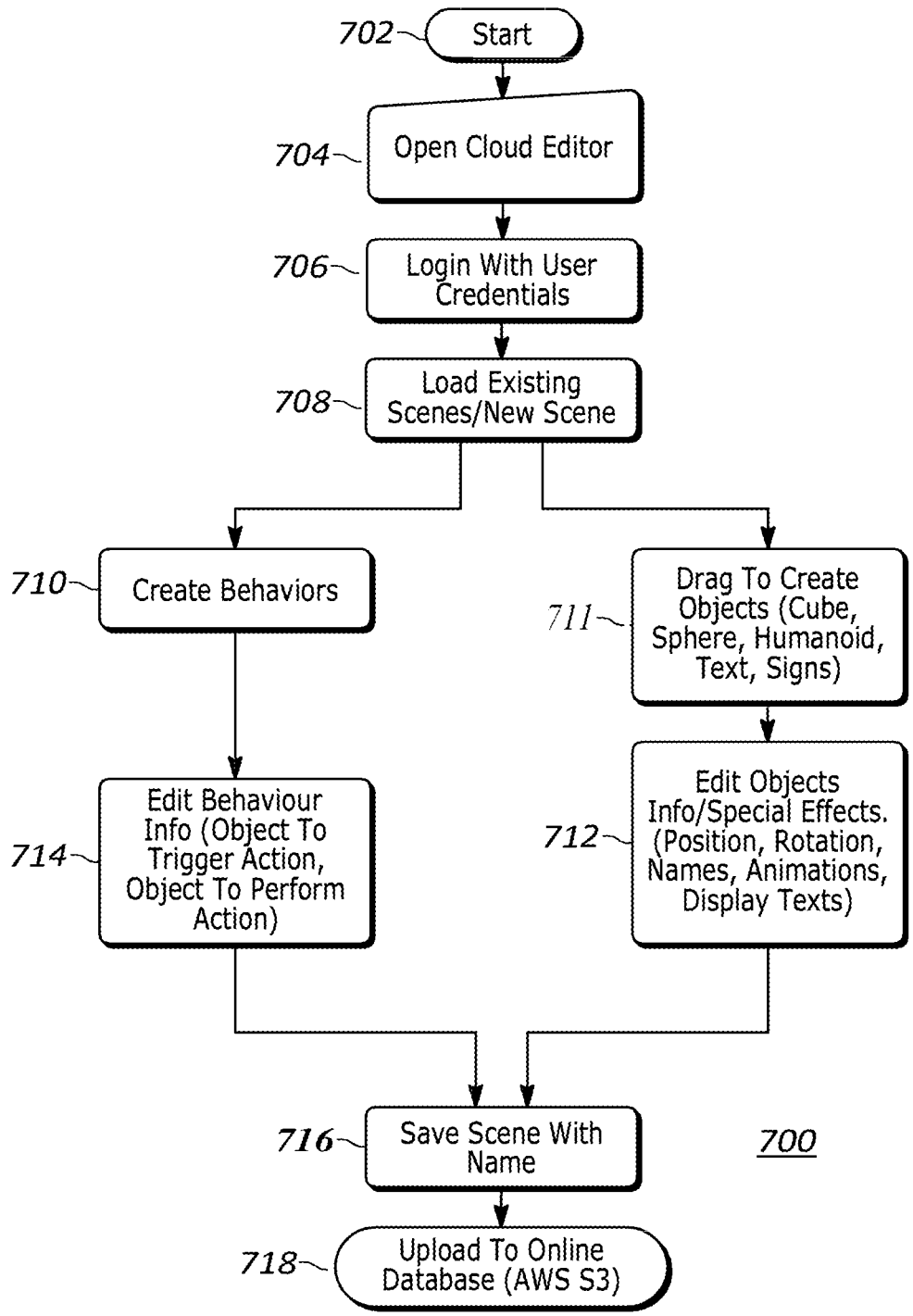

FIG. 7 illustrates an exemplary process creation flow 700 using the cloud editor. As shown, users begin 702 by opening the cloud editor 704 and logging in with their credentials 706 before choosing to either load an existing scene or create a new scene ate step 708. At step 711, the user drags one or more user interface icons into the workspace to create one or more objects. At step 712, the user edits object properties by dragging the object around the 3D environment and selecting one or more properties from the menu. Alternatively or concurrently, at step 710, the user may create one or more behaviors before editing the behavior of the object using the provided menu at step 714. At step 716, the user can select to save the scene for later use or publication before uploading the scene at step 718.

Figure 24:
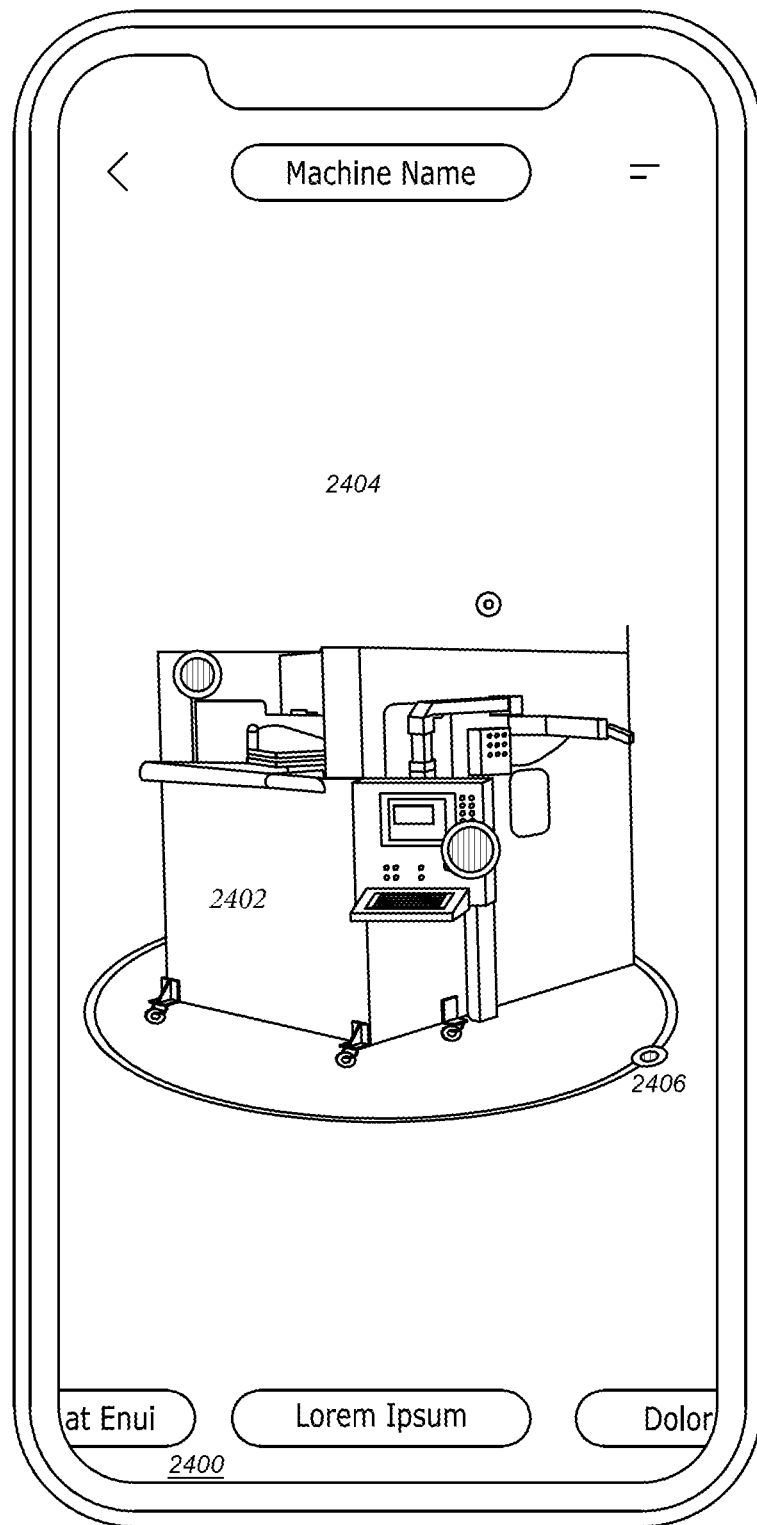
FIG. 24 illustrates an exemplary interaction with an AR object placed in a real world environment in accordance with an embodiment.

FIG. 24 illustrates an exemplary user interface 2400 for an interaction with an AR object 2402 placed in a real world environment 2404. As shown, the user can fully interact with the AR object 2402 using controls 2506 provided by the User App. This enables users to perform tasks such as pre-work or pre-study of working using the User App before handling the physical object itself. For example, a user may test out specific procedures using mobile gestures (providing a simpler form of hands-on training) or obtain remediation or refresher work as needed without needing to have access to the physical object. This is particularly advantageous for users in a factory setting who may not be able to interact with physical machinery without stopping factory operations (potentially costing significant time and/or expense in lost production).

Figure 25:
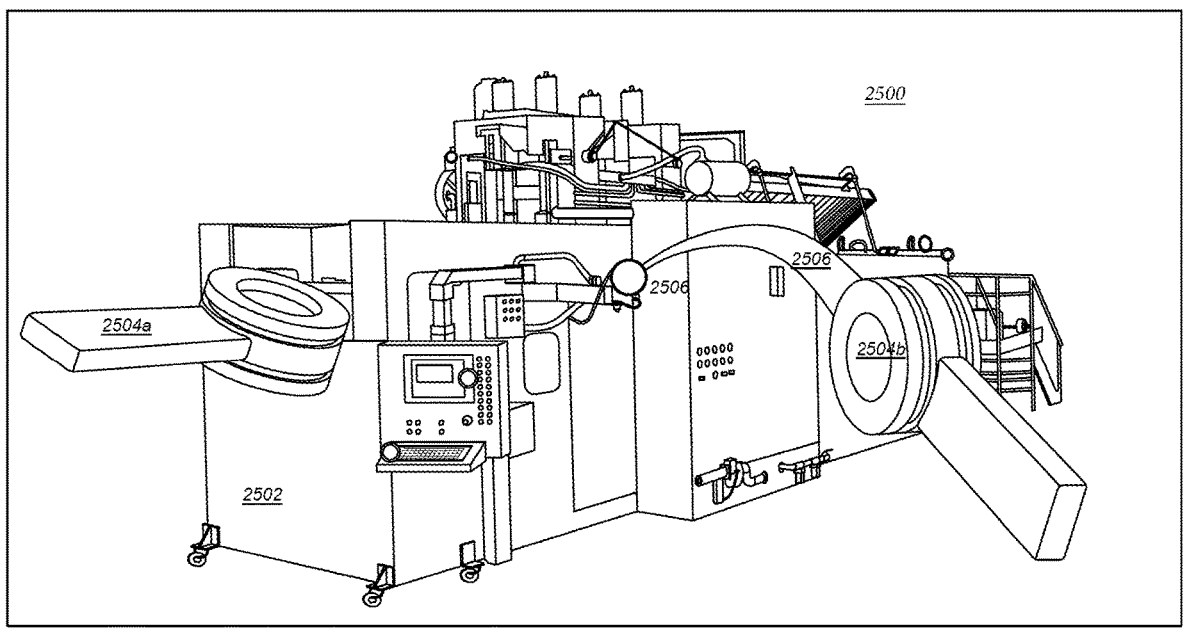
FIG. 25 illustrates a VR mode of operation in accordance with an embodiment.

FIG. 25 illustrates a VR mode of operation 2500. In the embodiment shown, a user may interact with a virtual representation of a real world object in a virtual environment. Such VR experiences can incorporate existing VR technology, such as the Oculus Quest, and allows for an entire real world task to be simulated. This enables users to obtain immersive training (which may be necessary for formal certification) without requiring access to a physical object. In embodiments, guidance is provided in the virtual environment (such as instructions for completing the task) along with real-time feedback based on the user's actions. In an embodiment, an instructor can remotely monitor performance and provide real-time feedback. In the embodiment shown, a virtual representation of a machine 2502 is displayed. The user is directed to simulate placing a part 2504a onto a specific location 2506 of the machine 2502 using VR annotations 2506; the user must match the representation of the part 2504a with the VR annotated version thereof 2504b.

In an embodiment, the User App provides a feedback mechanism whereby all skill-related user actions detected by the system are recorded to an LRS via xAPI statements. In an embodiment, such actions are sent to an online performance tracking (e.g., Twilio) via natural language understanding (NLU) functions. Embodiments provide a chatbot configured to provide interactive voice response (IVR) to users to provide immediate interactive feedback. Specific feedback may include notification of an "automatic failure" or action performed virtually that would have been dangerous if performed in a real environment, notification of excellent or standard proficiency with a particular task, instant remediation of errors, and interventions based on poor performance. In an embodiment, tracking statements are weighted, and overall pass/fail remediation thresholds are either preconfigured by an administrator or weighted by pre-defined importance (i.e., breakage, danger).

For embodiments employing online tracking, in an embodiment, an offline device is configured to store tracking information in offline storage and upload all locally cached records to online storage once a network connection is detected.

Use of Robot Process Automation (RPA)

Embodiments employ RPA to enable data intake and processing from public and/or private databases. In an embodiment, AR content may be created and populated based on RPA processing of existing, non-AR content. In an embodiment, RPA provides mass ingestion of pre-existing non-AR content, creates AR content, and associates the newly created AR experiences with other AR content and/or real world locations. Existing information may be obtained by utilizing a screen scrape, OCR process, and/or other automated method before performing processing to match obtained content to pre-created AR templates. Such custom AR content can be auto-populated with features including widgets, interactivity, calls to action, web links, and the like. AR content may be populated via a combination of RPA and JavaScript Object Notation (JSON) manifests before being combined into single packages (e.g., in the ZIP format). Once obtained, AR content may be manually or automatically deployed to specific users or organizations. Users may be provided with notification indicating the availability of newly created content.

Figure 26:
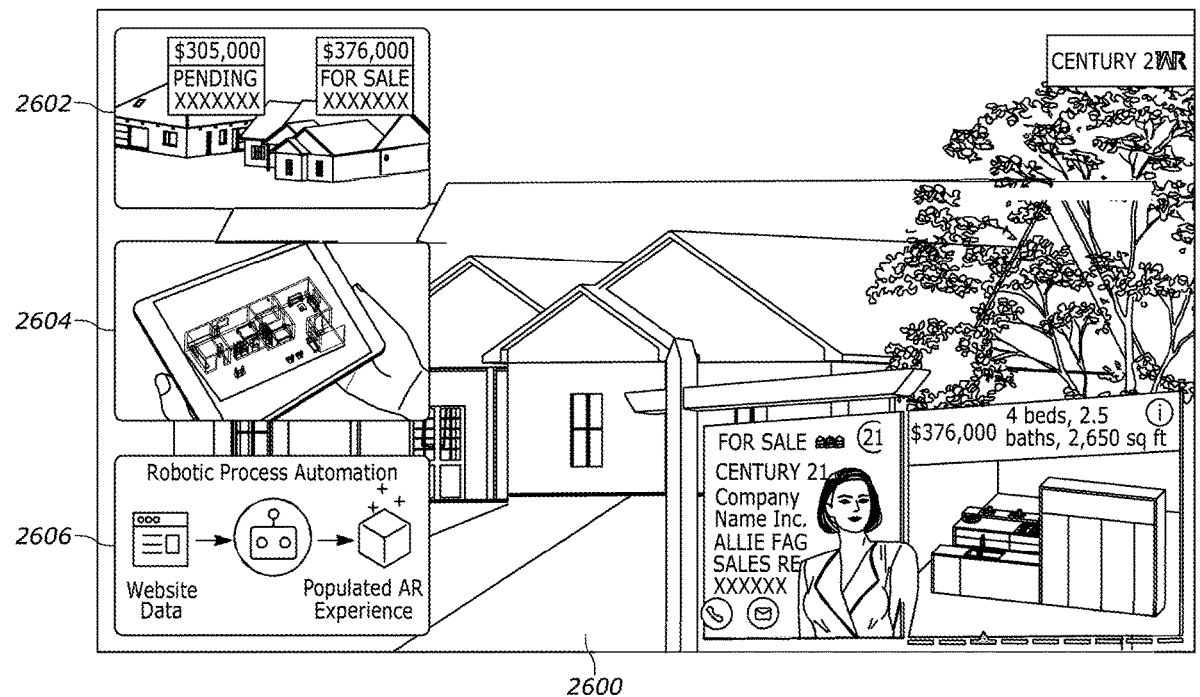
FIG. 26 depicts an exemplary illustration of such variable content in accordance with an embodiment.

In an embodiment, content is automatically combined into AR experiences incorporating information at varying distances (such as far, closer, and near) wherein the displayed content is adapted based on the user's distance from a location. FIG. 26 depicts an exemplary illustration of such variable content. As a user approaches a location, distant content 2602 may be displayed providing high-level information relevant to the location. As shown, this high-level information may include information as to whether a property is "for sale" and, if so, the current asking price. As the user approaches, the display of this information may adapt and be supplemented to "closer" content 2600. Here, the "closer" content comprises a virtual "for sale" sign and one or more images from inside the property. If the user desires, "close" content 2604 is then displayed. Here, the "close" content comprises a floor plan of a specific property. As shown in 2606, this content may be generated by using RPA to obtain information from a website, process it into relevant AR content, and populating the AR experience at a real world location.

Figure 3:
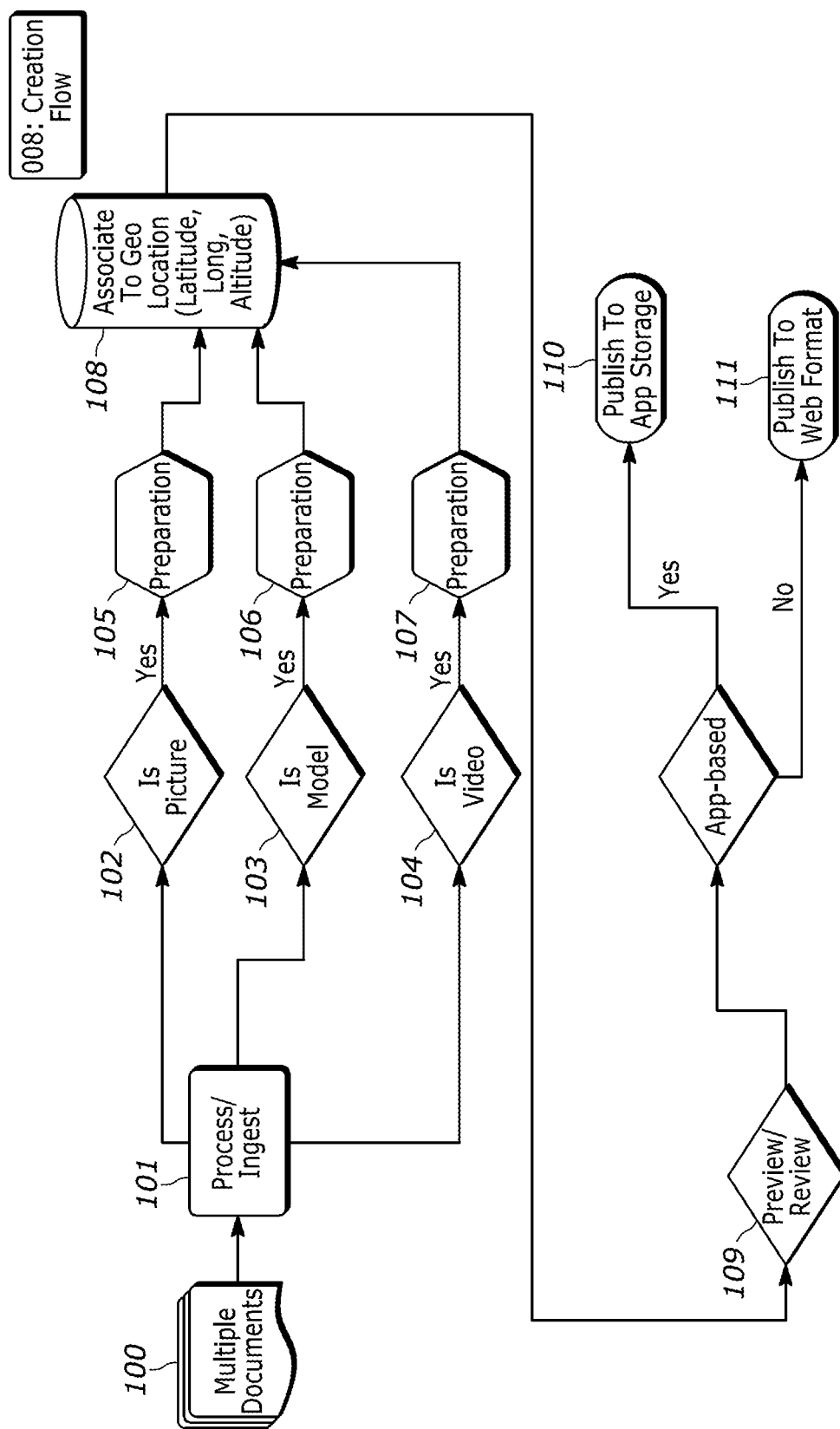

FIG. 3 illustrates an exemplary method of processing content using RPA to create AR content. As shown, the method begins at step 100 as one or more items are loaded into the system. At step 001, the system processes or ingests the provided content and categorizes the content as being a picture 102, model 103, or video 104. "Other" content may be manually matched to an existing template (such as, for example, textual information that should be displayed graphically). For each type of content, the system proceeds to prepare it 105, 106, 107 before assigning it to an applicable geo location at step 108. A user is then provided an opportunity to preview or review the generated content at step 109 before the content is published (either to app-based storage or an online database).

Overview of the TeamworkAR™ System.

In an embodiment, the TeamworkAR™ System includes a reporting mechanism, enabling the recordation of user's skill competencies via AR test procedures. Specific AR experiences are presented to a user, such as to repair a device. Sensors on device are used to track the user's real world operations (e.g., by using a camera with image recognition enabling the system to track the user's real world movements, including hand placement and operations). The system can thus provide adaptive experience where mistakes or errors made by a user are addressed through instantaneous AR feedback. In extreme cases, the user may be forced to reset and/or restart the operation until it is performed correctly. In this manner, the system may provide safety features where any potentially unsafe procedures are identified and the user is alerted before proceeding, allowing for the user (and/or others in the user's organization) to receive real-time feedback on the user's performance.

In an embodiment, the Unity XR Toolkit is used to create experiences. Embodiments provide functionality such as eye-tracking in addition to tracking of macro and/or micro movements by a user. In an embodiment, this compliance tracking is used to provide certification for tool and/or hand operations.

Exemplary Uses of Existing Technologies.

Embodiments are configured to utilize existing AR-adjacent technologies to provide a seamless AR experience. In an embodiment, eye-tracking implementations are accomplished through integration with AR Foundation, the Unity XR Toolkit, and underlying XR plugins available on Unity3D. In an embodiment, Twilio Autopilot is used to provide NLU functionality. In an embodiment, optical character recognition (OCR) and OpenCV is parsed and performance indicators sent to an IVR-capable chatbot to enable understanding and responses to text visible in a real environment. In an embodiment, performance indicators are stored as raw xAPI tracking statements.

Exemplary Use Cases for the TeamworkAR™ System.

The following description provides exemplary use cases for the User App. These descriptions are illustrative (and not limiting) of the wide variety of fields of use in which embodiments of the present disclosure may be advantageously employed.

In an embodiment, the User App is configured to assist with trouble-shooting hardware issues. In this embodiment, the computing device on which the User App operates (such as a standard smartphone) includes a camera and a display. A user activates the User App such that its user interface is displayed on the screen of the smartphone and points the camera of the smartphone at a device in need of repair. The User App, taking information obtained through the camera, compares the appearance of the device to a known database of devices that may be repaired in order to identify the specific device at issue. The User App then uses the user interface to display a series of pre-defined options to the user, identifying the types of repairs that may be performed. Once the user selects the specific repair task to be accomplished using the standard inputs on the smartphone (e.g., the touch screen included in the smartphone's display), the User App presents the steps to be carried out in the repair using the user interface. The steps may be displayed as textual information and/or annotations on the device to be repaired. For example, if a series of screws must be removed, the user interface may display text informing the user of the task to be accomplished while also highlighting or otherwise directing the user's attention to the specific screws to be removed. In the event that the device must be manipulated (e.g., turned in order to expose the screws to be removed), the user interface may display annotations (such as arrows) or animations (such as a superimposed image of the device rotating) in order to guide the user to perform the requisite action. By monitoring the user's process using the smartphone's sensors (e.g., the camera), the User App recognizes once the problem has been resolved and is able to display the correct series of steps at the requisite time (and in the needed order) to accomplish the repair task.

Content for each procedure to be accomplished may be authored in advance, as discussed herein, by reducing the procedure to a series of required and alternative steps, possible workflows, and visually animated representations.

By presenting information in this manner and adapting to the actions performed by a user, embodiments provide reduced costs, increased efficiency, reduced downtime, enhanced training options, lower return volumes, and accelerated technology adoption.

In an embodiment, an operator equipped with a device running the User App in a factory is guided, with or without real-time human assistance, through a maintenance procedure. As before, each step in the maintenance procedure is displayed to the operator on the device using AR and the display is updated as sensors on the device monitor the operator's progress.

In an embodiment, the User App is used in a training environment, where a particular item is presented virtually to the trainee using the User App on a device. The trainee may interact with the item virtually, enabling the trainee to gain "hands on" experience repairing or using the item without the costs associated with obtaining, shipping, and otherwise providing the training with the real world item. This companies to easily and inexpensively scale to a large work group, as training occurs completely in a digital environment.

In an embodiment, sales teams employ the User App salespersons to complement phone calls, emails, documents, and linear video with virtual demonstrations that provide actual or prospective customers with AR presentations to enrich the sales experience.

In an embodiment, the User App is used to provide customer support. Individuals needing support first access the User App, which attempts to match the individual's issue to the pre-loaded solutions contained in the User App. If a match is found, the individual uses the User App to address the problem without requiring further involvement from customer support. If a match cannot be found, the User App connects the individual to a customer support agent using video, audio, and/or other information provided by sensors on the individual's device running the User App to allow for comprehensive troubleshooting and support. The customer support agent can not only gather information from the individual's device, but also display AR content to the user to guide the user through a troubleshooting or repair process.

Figure 27:
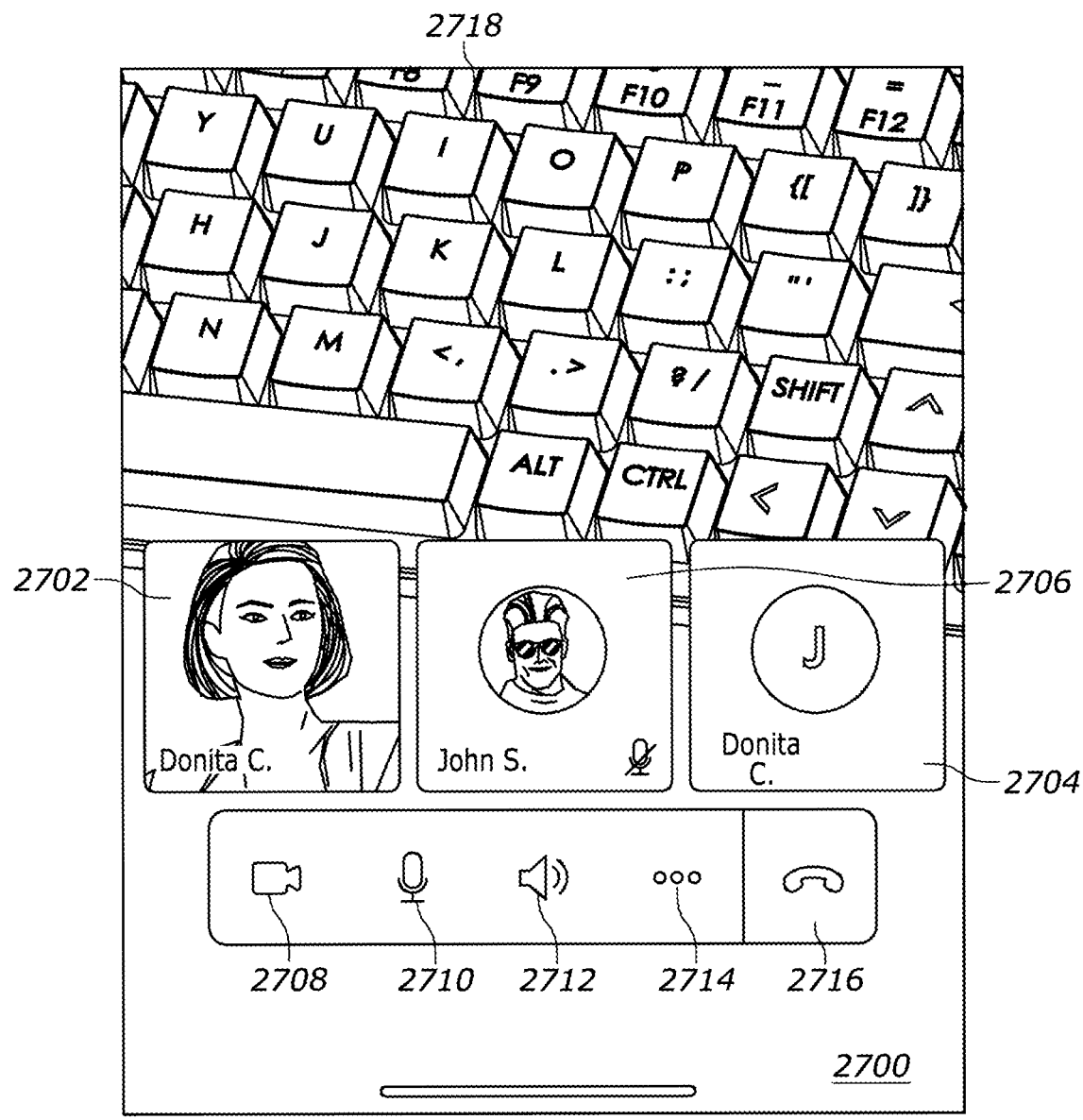
FIG. 27 depicts an exemplary illustration of a user interface for group collaboration in accordance with an embodiment.

FIG. 27 depicts an exemplary illustration of a user interface 2700 for group collaboration in accordance with an embodiment. As shown, the user interface 2700 may display video for a participant 2702, a still photograph for a participant 2706, or a textual indicator for a participant 2704.

Multiple individuals may be connected together and interact while simultaneously experiencing the same content 2718, which may be AR, VR, or audio-visual content. As shown, the content 2718 is a live video stream taken by the camera of one of the users; AR content may be superimposed thereon or incorporated therein. The user interface 2700 further comprises options to share video 2708, mute a user 2710, connect to speakers or another audio device 2712, access additional options 2714, or end the connection 2716.

Exemplary Mobile Application

FIGS. 28 through 44 depicts exemplary illustrations of a user interface for a mobile application in accordance with an embodiment.

As shown in FIGS. 28 through 30, in an embodiment a login screen 2800 is displayed upon launch. The login screen 2800 may contain an identifier 2802 of the application and/or its provider, a user field 2804 to input a user identifier (e.g., a user name or email address), a password field 2804, and a submit button 2808. In an embodiment, information is input using an on-screen keyboard 2810. In alternative embodiments, the on-screen keyboard 2810 is omitted and information is input using other means, such as by way of illustration and not limitation, a physical keyboard, voice to text, or other input devices as will be appreciated by one of skill in the art.

As shown in FIGS. 31 through 3:3, in an embodiment a welcome screen 3100 is displayed after authentication upon first launch. The welcome screen 3100 may contain an identifier 2802 of the application and/or its provider, an info graphic 3102, 3112, 3116 illustrating uses of the application, informational text 3104, 3114, 3118 explaining uses of the app, the option 3106 to access an information video or other information, an indicator 3108 of position of the current view in relation to the welcome screen 3100 as a whole, and an option 3110 to skip the introduction.

Figure 34:
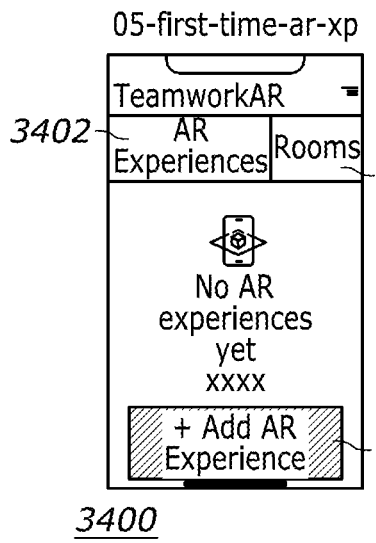
Figure 35:
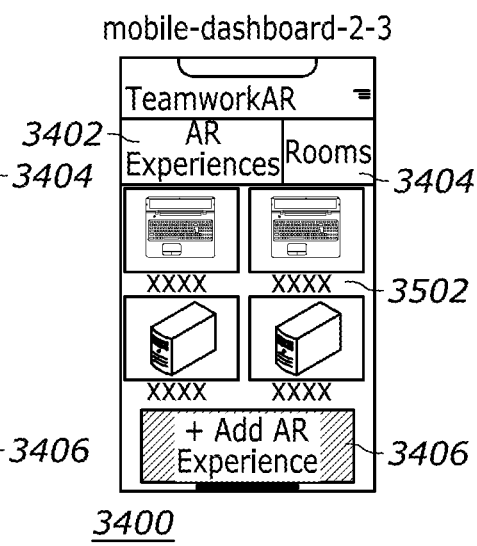

FIGS. 34 and 35 depict an embodiment of a user interface 3400 for selecting an AR experience. As shown, the user interface 3400 includes options to select AR experiences 3402 and rooms 3404, along with an option to add an AR experience 3406. As shown in FIG. 34, initially there may be no AR experiences available, and the user interface 3400 displays a message 3408 to that effect. Once AR experiences are added, visual indicia 3502 for each available AR experience are displayed and may be selected.

FIG. 35 depicts an embodiment of a user interface 3600 for downloading assets. AR experiences and other content may be downloaded remotely for use on a local application.

Figure 36:
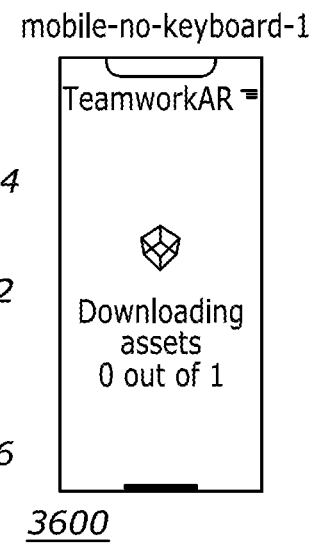
Figure 37:
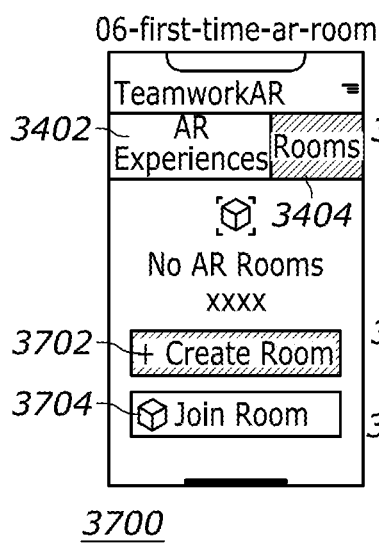
Figure 38:
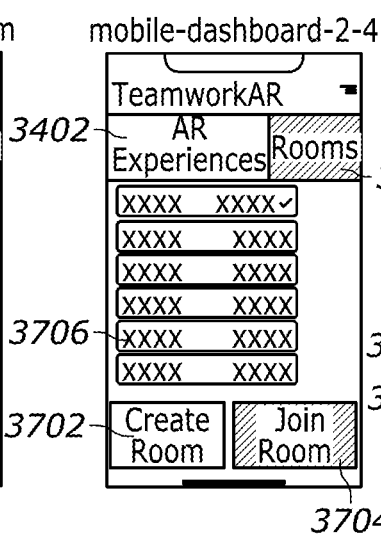

FIGS. 36 and 37 depict an embodiment of a user interface 3600 for selecting a room. As shown, the user interface 3600 includes options to select AR experiences 3402 and rooms 3404, along with an option to create a room 3702. As shown in FIG. 36, if no public rooms are available a user is provided with the option to either create a room 3702 or join a specified private room 3704. Alternatively, if public rooms are available, as shown in FIG. 37 a list 3706 of available rooms is displayed. The list may include details regarding the rooms, such as the number of users in each, a topic or title for the room, or the name(s) of those already present in the room.

Figure 39:
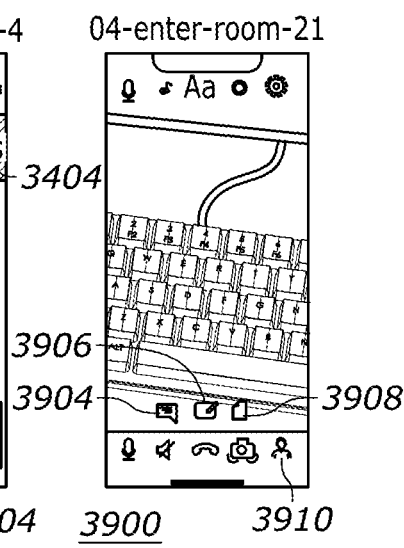
Figure 40:
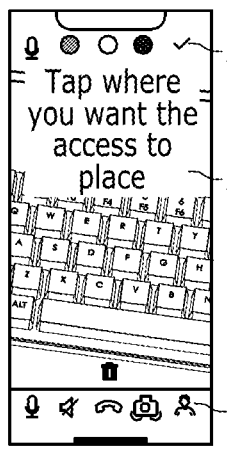

FIGS. 39 and 40 depict an embodiment of a user interface 3900 for accessing a room. As shown, content 3912, which may be AR, VR, or audio-visual content, is displayed to all users in a room. A user is presented with options 3902 for reviewing the content, including to annotate the content 3912 or incorporate AR elements therein. As shown, the content 3912 is a live video stream taken by the camera of one of the users; AR content may be superimposed thereon or incorporated therein. Users further have the option to chat 3904 with other users in the room, display a whiteboard 3906 to other users in the room, and transfer files 3908 to users in the room. Controls 3910 enable a user to modify the content 3912 (e.g., by flipping the camera), control audio options as discussed herein, leave the room, or invite users to the room. As shown in FIG. 40, the options 3902 are context sensitive and may permit a user to annotate the content 3912 or add AR elements to the content 3912.

Figure 41:
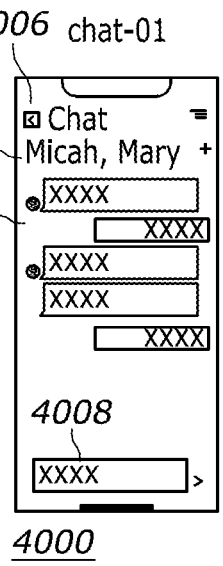
Figure 42:
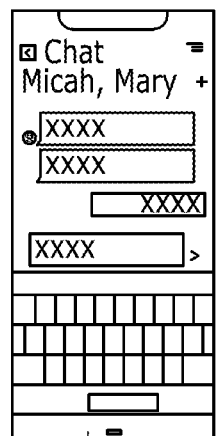

FIGS. 41 and 42 depict a user interface 4000 for conducting a chat session with other users. As shown, users have the option 4206 to return to a menu displaying available chats. The users included in the chat are displayed in a list 4002 above a series of messages 4004 sent in the chat. Users can input new messages in the input field 4008. In an embodiment, information is input using an on-screen keyboard 4010. In alternative embodiments, the on-screen keyboard 4010 is omitted and information is input using other means, such as by way of illustration and not limitation, a physical keyboard, voice to text, or other input devices as will be appreciated by one of skill in the art.

Figure 43:
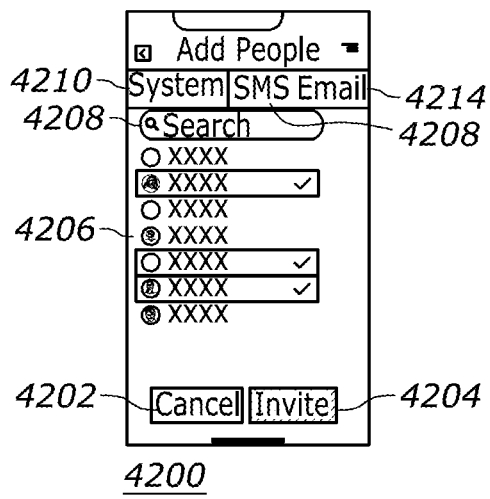
Figure 44:
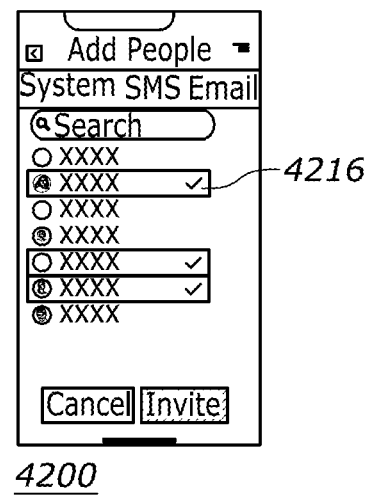

FIGS. 43 and 44 depict a user interface 4200 for adding users to a chat. Users can be added from the system 4210 (e.g., other users on the mobile application using separate devices and/or users accessing the system through web browsers or other devices), via an SMS message 4212, and via email 4214. Once a user is invited, they receive a message with a link to join the chat using the selected service. User can be located through search 4208, and a list of available users 4206 on the selected service is displayed. One or more users may be selected 4216 and then added automatically or after opting in (e.g., by selecting the link).

Additional Embodiments

In an embodiment, the User App is configured to permit crowdsourced solution. As users solve new problems using the User App that are not addressed by existing solutions stored within the User App, the User App can automatically record the steps taken by a user to either create new solutions (that are then pushed out to other users) or to flag particular problems as requiring development of new solutions.

In an embodiment, the User App is used to integrate AR, digital twinning, the Experience API (or xAPI) and computer vision to assist users in learning on equipment that is not physically present, using AR to display the equipment while reporting the learning activities.

In an embodiment, the User App is used to provide field services. The User App provides step-by-step instructions, using AR, to customers, and/or technicians to allow them to complete a task or a repair. The actions of the work individuals are tracked, and verified using computer vison or other sensing technology, with immediate feedback provided and all activities recorded for learning and/or compliance.

Embodiments may be used in a variety of industries, including pharmaceuticals, medical, and health care. Embodiments use geo-location and anchor improvements to reduce drift along with computer vision for AR placement so as to align medical images on patients.

Embodiments provide AR digital instruction, video and audio collaboration, drawing annotation, form scanning and image and object recognition.

Embodiments for in the oil, gas, utility, and mining industries provide VR safety simulation, oil rig virtual collaborations, self-directed SOPs and checklists.

Embodiments for the automotive, aviation, and aerospace industries provide digital twin, voice-enabled AR for customization, product walkthroughs, and simulation.

Embodiments for the finance, real estate, and insurance industries provide for the bulk importation of sign and housing data and media. Location-based notifications may advise users that AR content is present. Existing data can be imported through form scans and ICR/OCR recognition of form completion.

Embodiments for the manufacturing and heavy machinery industries provide hands free "see what I see" video collaboration and archival. Embodiments provide digital twinning of real objects for pre-training. Embodiments provide object recognition and steps with computer vision. Embodiments provide for offline distribution of AR content for low-bandwidth/weak Internet applications.

Embodiments for use in the architecture, engineering, and construction industries provide point cloud manipulation to place AR elements within scanned environments. LIDAR recording allows for recreation of scanned architectural sites and 3D engineering models generated from AR scans.

Embodiments for the travel and hospitality industries provide for 360 camera walkthroughs of real locations in AR, including AR placement of elements, walkthrough paths with destination maps, and virtual greeters with an IVR chatbot.

The foregoing examples have been provided merely for the purpose of explanation, and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

Any other undisclosed or incidental details of the construction or composition of the various elements of the disclosed embodiment of the present invention are not believed to be critical to the achievement of the advantages of the present invention, so long as the elements possess the attributes needed for them to perform as disclosed. Certainly, one skilled in the XR field would be able to conceive of a wide variety of alternative system configurations and successful combinations thereof. The selection of these and other details of construction are believed to be well within the ability of one of even rudimental skills in this area, in view of the present disclosure. Illustrative embodiments of the present invention have been described in considerable detail for the purpose of disclosing a practical, operative structure whereby the invention may be practiced advantageously. The designs described herein are intended to be exemplary only. The novel characteristics of the invention may be incorporated in other structural forms without departing from the spirit and scope of the invention. The invention encompasses embodiments both comprising and consisting of the elements described with reference to the illustrative embodiments. All technical terms shall take on their customary meaning as established by the appropriate technical discipline utilized by those normally skilled in that particular art area.

The invention claimed is:

1. A system comprising:
a user device;
a server communicatively coupled to the user device and one or more databases, the server comprising one or more first processors and a first memory comprising first instructions;
wherein the first instructions, when executed by the one or more first processors, cause the server to perform operations comprising:
transmitting, to the user device, a first set of commands configured to cause the user device to generate a graphical user interface;
receiving, from the user device, a first set of information;
transmitting, to the user device, a second set of information from the one or more databases configured to cause the graphical user interface, to display an XR experience, wherein the second set of information is selected based at least in part on the first set of information;
receiving, from the user device, a third set of information corresponding to one or more actions taken on the user devices while viewing the XR experience; and
based on the third set of information, changing the contents of at least one of the one or more databases;
wherein the first set of information comprises an identifier of an object, at least a portion of the second set of information identifies a plurality of operations that can be performed on the object, the user device comprises a camera configured to record video of a real world analog of the object, and the first instructions, when executed by the one or more first processors, cause the server to perform further operations comprising:
before the graphical user interface displays the XR experience, causing the user device to display the plurality of operations and receive an identification of a first one of the plurality of operations; and
based on the identification, displaying in the XR experience a series of steps that together comprise the operation;
wherein the XR experience superimposes the series of steps alongside the video of the real world analog of the object and determines which of the series of steps to display based on the video.

2. The system of claim 1, wherein the series of steps comprises textual information.

3. The system of claim 1, wherein the series of steps comprise annotations superimposed on the video of the real world analog of the object.

4. The system of claim 1, wherein the series of steps comprise a virtual representation of the object.

5. The system of claim 4, wherein the virtual representation of the object is animated to indicate actions to be performed on the real world analog of the object.

6. The system of claim 5, wherein the virtual representation of the object is annotated to indicate actions to be performed on the real world analog of the object.

* * * * *